United States Patent
Sato et al.

(10) Patent No.: US 9,299,298 B2
(45) Date of Patent: Mar. 29, 2016

(54) DISPLAY UNIT

(71) Applicant: Sony Corporation, Tokyo (JP)

(72) Inventors: Yoshihisa Sato, Saitama (JP); Shogo Shinkai, Kanagawa (JP); Kentaro Okuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 47 days.

(21) Appl. No.: 14/347,906

(22) PCT Filed: Sep. 27, 2012

(86) PCT No.: PCT/JP2012/074966
§ 371 (c)(1),
(2) Date: Mar. 27, 2014

(87) PCT Pub. No.: WO2013/051465
PCT Pub. Date: Apr. 11, 2013

(65) Prior Publication Data
US 2014/0232834 A1    Aug. 21, 2014

(30) Foreign Application Priority Data

Oct. 4, 2011   (JP) .................. 2011-220229

(51) Int. Cl.
| | |
|---|---|
| *G09G 3/36* | (2006.01) |
| *G02B 27/22* | (2006.01) |
| *G09G 3/00* | (2006.01) |
| *G09G 3/34* | (2006.01) |
| *G09G 5/00* | (2006.01) |
| *H04N 13/04* | (2006.01) |
| *G02B 27/26* | (2006.01) |

(52) U.S. Cl.
CPC ............... *G09G 3/36* (2013.01); *G02B 27/225* (2013.01); *G09G 3/003* (2013.01); *G09G 3/342* (2013.01); *G09G 3/3648* (2013.01); *G09G 5/003* (2013.01); *H04N 13/0452* (2013.01); *G02B 27/26* (2013.01); *G09G 2300/023* (2013.01); *G09G 2300/0426* (2013.01); *G09G 2300/0447* (2013.01); *G09G 2310/024* (2013.01); *G09G 2320/0209* (2013.01)

(58) Field of Classification Search
CPC ........... G09G 3/36–3/3696; G09G 2310/0237; G09G 2310/024
USPC ........................................ 345/48, 50, 87–104
See application file for complete search history.

(56) References Cited

U.S. PATENT DOCUMENTS

| | | | |
|---|---|---|---|
| 2008/0297671 A1* | 12/2008 | Cha et al. ...................... | 349/15 |
| 2011/0279490 A1* | 11/2011 | Lee et al. ...................... | 345/691 |

FOREIGN PATENT DOCUMENTS

| | | |
|---|---|---|
| JP | 2010-243580 | 10/2010 |
| JP | 2011-158668 | 8/2011 |
| JP | 2012-103400 | 5/2012 |
| JP | 2012-141588 | 7/2012 |

OTHER PUBLICATIONS http://www.sony.jp/CorporateCruise/Press/201009/10-0907 (5 pages).

* cited by examiner

*Primary Examiner* — Stephen Sherman
(74) *Attorney, Agent, or Firm* — K&L Gates LLP

(57) ABSTRACT

The purpose of the present invention is to provide a three dimensional image display device capable of preventing the generation of crosstalk. The three dimensional image display device according to the present invention includes a display panel having a plurality of pixels, a backlight capable of partially illuminating the display panel, and a drive circuit for driving the display panel and the backlight. The drive circuit causes the display panel to display a three dimensional image by synchronizing the scanning of the display panel with the scanning of the partial illumination light (Lz) of the backlight.

11 Claims, 29 Drawing Sheets

DISPLAY UNIT

CROSS REFERENCES TO RELATED APPLICATIONS

The present application is a national stage of International Application No. PCT/JP2012/074966 filed on Sep. 27, 2012 and claims priority to Japanese Patent Application No. 2011-220229 filed on Oct. 4, 2011, the disclosure of which is incorporated herein by reference.

BACKGROUND

The present technology relates to a display unit capable of performing two-dimensional display (planar display) and three-dimensional display (stereoscopic display).

Display units capable of performing three-dimensional display include display units in which it is necessary for a viewer to wear special glasses and display units in which it is unnecessary for a viewer to wear special glasses. The latter display unit uses a lenticular lens or a parallax barrier in order to allow a stereoscopic picture to be visually observed with naked eyes. Picture information is divided into information for a right eye and information for a left eye by the lenticular lens or the parallax barrier, and thus different pictures are observed by the right and left eyes. As a result, three-dimensional display becomes possible.

Incidentally, in the display unit of glasses system, for example, when picture display is performed by 120 Hz (double speed) driving, a right eye picture and a left eye picture are mixed at the time of alternately switching the right eye picture and the left eye picture to generate double image (crosstalk). Therefore, in the display unit of glasses system, for example, a method in which picture display is performed by quad-speed driving, and liquid crystal shutters of 3D glasses are closed during a picture rewriting period to reduce the crosstalk is employed (for example, NPL 1).

On the other hand, in the display unit of naked eye system, since 3D glasses shielding pictures during the picture rewriting period do not exist, some measures to allow the pictures under picture rewiring not to be displayed are necessary. For example, in PTL 1, a method in which a display region is divided into two upper and lower regions, and extinction is performed in one region to allow the picture under the picture rewiring not to be displayed has been disclosed.

CITATION LIST

Non Patent Literature

NPL 1: http://www.sony.jp/CorporateCruise/Press/201009/10-0907/

Patent Literature

PTL 1: Japanese Unexamined Patent Application Publication No. 2010-243580

SUMMARY

However, when a region under picture rewriting exists in the both regions, it is disadvantageously difficult to prevent occurrence of the crosstalk by the method described in PTL 2.

It is desirable to provide a display unit capable of preventing occurrence of crosstalk.

According to an embodiment of the present technology, there is provided a display unit including: a display panel having a plurality of pixels; a backlight capable of partially illuminating the display panel; and a drive circuit configured to drive the display panel and the backlight. The drive circuit synchronizes scanning of the display panel with scanning of partial illumination light beams of the backlight to allow the display panel to display a three-dimensional picture.

In the display unit according to the embodiment of the present technology, when the three-dimensional picture is displayed on the display panel, the scanning of the display panel is synchronized with the scanning of the partial illumination light beams of the backlight. As a result, it is possible to put the region under picture rewiring into a non-display state surely.

In the display unit according to the embodiment of the present technology, the region under the picture rewriting is put into a non-display state surely. Therefore, it is possible to prevent occurrence of crosstalk.

Additional features and advantages are described herein, and will be apparent from the following Detailed Description and the figures.

DETAILED DESCRIPTION

An embodiment for carrying out the present invention will be described in detail below with reference to drawings. Note that description will be given in the following order.
1. Embodiment
An example in which scanning of illumination light beams of a backlight is synchronized with scanning of a display panel
2. Modifications
An example in which pixel columns are time-divisionally driven
An example in which a picture signal is written two times
<1. Embodiment>
(Configuration of Transmitting and Receiving System of Television Broadcasting Signal)

Figure 1:
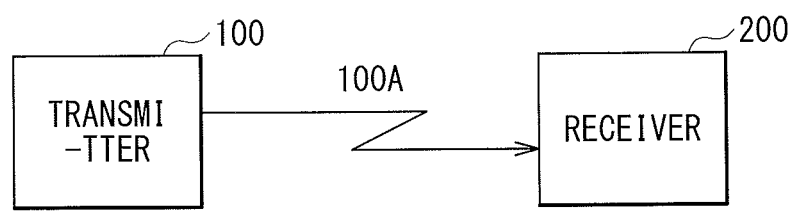
FIG. 1 is a diagram illustrating an example of a transmitting and receiving system of a television broadcasting signal according to an embodiment of the present technology.

FIG. 1 is a block diagram illustrating a configuration example of a transmitting and receiving system of a television broadcasting signal 100A, including a receiver 200, according to an embodiment of the technology. The transmitting and receiving system may include, for example, a transmitter 100 configured to transmit a television broadcasting signal through wired communication (such as cable TV) or wireless communication (such as terrestrial digital waves and satellite waves), and the receiver 200 configured to receive the television broadcasting signal from the transmitter 100 through the above-described wired or wireless communication.

The television broadcasting signal 100A contains picture data for two-dimensional display (planar display) or picture data for three-dimensional display (stereoscopic display). In this case, the picture data for two-dimensional display indicates two-dimensional picture data not containing perspective information. Moreover, the picture data for three-dimensional display indicates two-dimensional picture data containing perspective information, and the picture data for three-dimensional display includes a plurality of pieces of two-dimensional picture data with different perspectives. For example, the transmitter 100 may be a television broadcasting signal transmitter placed in a broadcast station, or a server on the Internet.

(Functional Block of Receiver 200)

Figure 2:
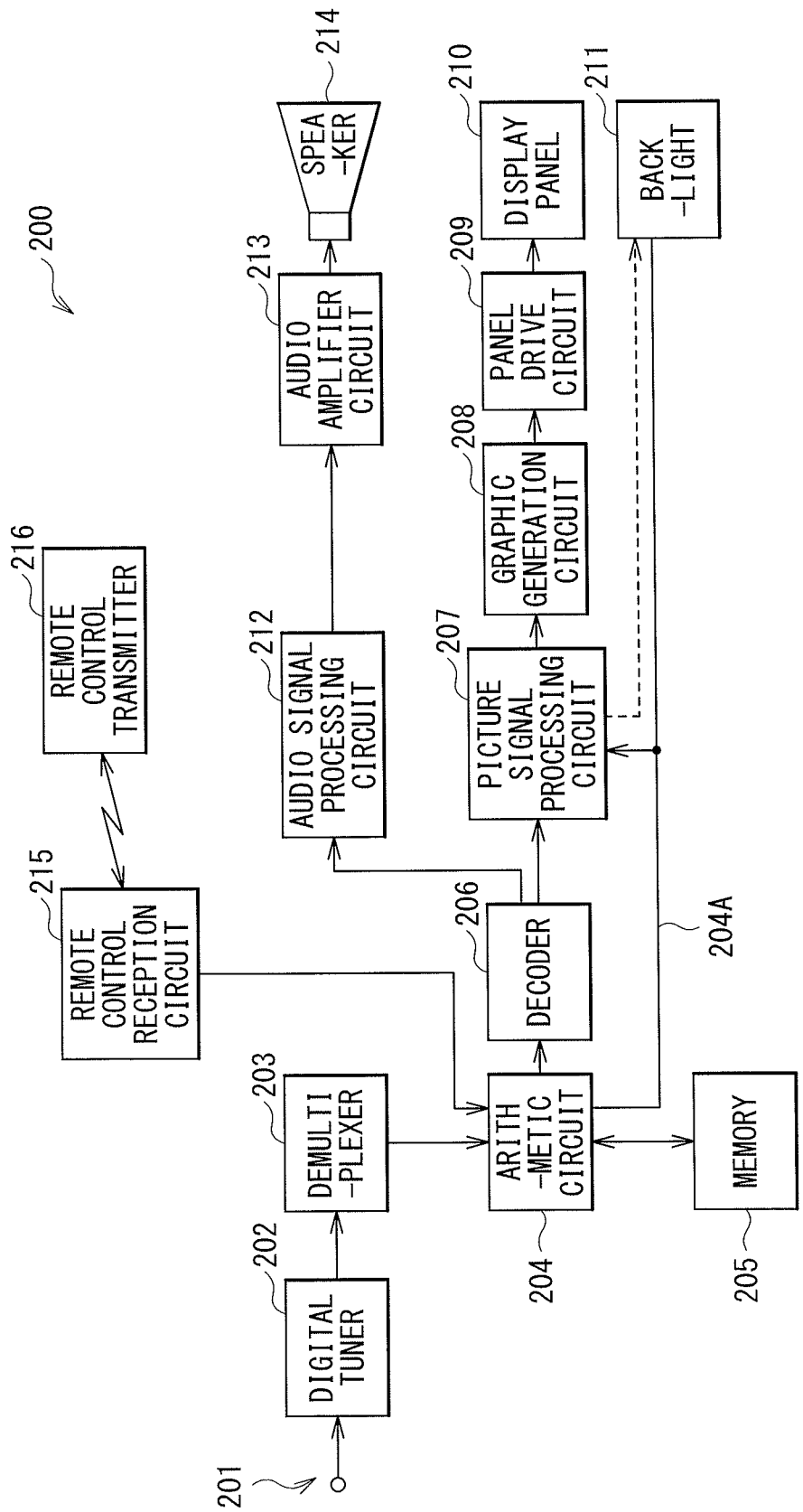
FIG. 2 is a diagram illustrating an example of a functional block of a receiver in FIG. 1.

FIG. 2 is a block diagram illustrating a configuration example of the receiver 200. For example, the receiver 200 may be a television connectable to the above-described wired or wireless communication. The receiver 200 may include, for example, an antenna terminal 201, a digital tuner 202, a demultiplexer 203, an arithmetic circuit 204, and a memory 205. In addition, the receiver 200 may include, for example, a decoder 206, a picture signal processing circuit 207, a graphic generation circuit 208, a panel drive circuit 209, a display panel 210, a backlight 211, an audio signal processing circuit 212, an audio amplifier circuit 213, and a speaker 214. Furthermore, the receiver 200 may include, for example, a remote control (hereinafter, referred to as "remote control") reception circuit 215, and a remote control transmitter 216.

The antenna terminal 201 is a terminal receiving a television broadcasting signal received by a receiving antenna (not illustrated). For example, the digital tuner 202 may process the television broadcasting signal input to the antenna terminal 201, and output a predetermined transport stream corresponding to a channel selected by a user. For example, the demultiplexer 203 may extract a partial transport stream (TS) corresponding to the channel selected by the user, from the transport stream obtained in the digital tuner 202.

The arithmetic circuit 204 controls operation of each section in the receiver 200. For example, the arithmetic circuit 204 may store the partial TS obtained in the demultiplexer 203 in the memory 205, or transmit the partial TS read from the memory 205 to the decoder 206. In addition, for example, the arithmetic circuit 204 may transmit a control signal 204A specifying two-dimensional display or three-dimensional display to the picture signal processing circuit 207 and the backlight 211. The arithmetic circuit 204 sets the above-described control signal 204A, based on, for example, setting information stored in the memory 205, predetermined information included in the partial TS, or setting information input from the remote control reception circuit 215.

For example, the memory 205 may hold setting information of the receiver 200 and performs data management. For example, the memory 205 may be capable of holding the partial TS obtained in the demultiplexer 203 and setting information such as a display method.

For example, the decoder 206 may perform decode processing on picture packetized elementary stream (PES) packets included in the partial TS that is obtained in the demultiplexer 203, to obtain picture data. Moreover, for example, the decoder 206 may perform decode processing on audio PES packets included in the partial TS that is obtained in the demultiplexer 203, to obtain audio data. In this case, the picture data indicates picture data for two-dimensional display or picture data for three-dimensional display.

For example, the picture signal processing circuit 207 and the graphic generation circuit 208 may perform multi-image processing, superimposing processing of graphics data, and the like, as necessary, on the picture data obtained in the decoder 206.

In the case where a signal specifying three-dimensional display is input as the control signal 204A from the arithmetic circuit 204 and the picture data input from the decoder 206 is picture data for three-dimensional display, for example, the picture signal processing circuit 207 may create one piece of two-dimensional picture data with use of a plurality of pieces of two-dimensional picture data with different perspectives that are contained in the picture data for three-dimensional display input from the decoder 206, and select the created two-dimensional picture data as picture data to be output to the graphic generation circuit 208. For example, in the case where the picture data for three-dimensional display contains two pieces of two-dimensional picture data with different perspectives, the picture signal processing circuit 207 may perform processing, for each row, to alternately arrange the two pieces of two-dimensional picture data in a horizontal direction, and thus create one piece of picture data in which the two pieces of two-dimensional picture data are alternately arranged in the horizontal direction. Likewise, for example, in the case where the picture data for three-dimensional display contains four pieces of two-dimensional picture data with different perspectives, the picture signal processing circuit 207 may perform processing, for each row, to arrange the four pieces of two-dimensional picture data one by one periodically in the horizontal direction, and thus create one piece of picture data in which the four pieces of two-dimensional picture data are arranged one by one periodically in the horizontal direction.

In the case where a signal specifying two-dimensional display is input as the control signal 204A from the arithmetic circuit 204 and the picture data input from the decoder 206 is picture data for three-dimensional display, for example, the picture signal processing circuit 207 may select one piece of picture data of a plurality of pieces of two-dimensional picture data with different perspectives contained in the picture data for three-dimensional display that is input from the decoder 206, as picture data to be output to the graphic generation circuit 208. In the case where a signal specifying two-dimensional display as the control signal 204A is input from the arithmetic circuit 204 and the picture data input from the decoder 206 is picture data for two-dimensional display, for example, the picture signal processing circuit 207 may select the picture data for two-dimensional display input from the decoder 206, as picture data to be output to the graphic generation circuit 208.

For example, the graphic generation circuit 208 may generate an user interface (UI) screen used in screen display. For example, the panel drive circuit 209 may drive the display panel 210, based on the picture data output from the graphic generation circuit 208.

The panel drive circuit 209 performs active matrix driving on each of the pixels included in the display panel 210 to display an image based on the picture data on the display panel 210. The panel drive circuit 209 outputs picture signals (V1 to V4 described later) for one pixel row corresponding to the picture data, to the respective data lines of the display panel 210 in response to (in synchronization with) a synchronization signal included in the control signal 204A, and accordingly the panel drive circuit 209 performs writing to the respective pixels to be selected. Note that writing indicates that a voltage corresponding to a display signal is applied to a pixel circuit. Further, the panel drive circuit 209 sequentially applies a selection signal to the plurality of scan lines in response to (in synchronization with) the synchronization signal included in the control signal 204A, and accordingly sequentially selects the respective pixel rows.

The configurations of the display panel 210 and the backlight 211 will be described later. For example, the audio signal processing circuit 212 may perform processing such as D/A conversion on audio data obtained in the decoder 206. For example, the audio amplifier circuit 213 may amplify an audio signal output from the audio signal processing circuit 212 to supply the amplified audio signal to the speaker 214.

For example, the remote control reception circuit 215 may receive a remote control signal transmitted from the remote control transmitter 216, and supply the received remote control signal to the arithmetic circuit 204. For example, the arithmetic circuit 204 may control each section in the receiver 200 according to the remote control signal.

(Cross-Sectional Structure of Receiver 200)

Figure 3:
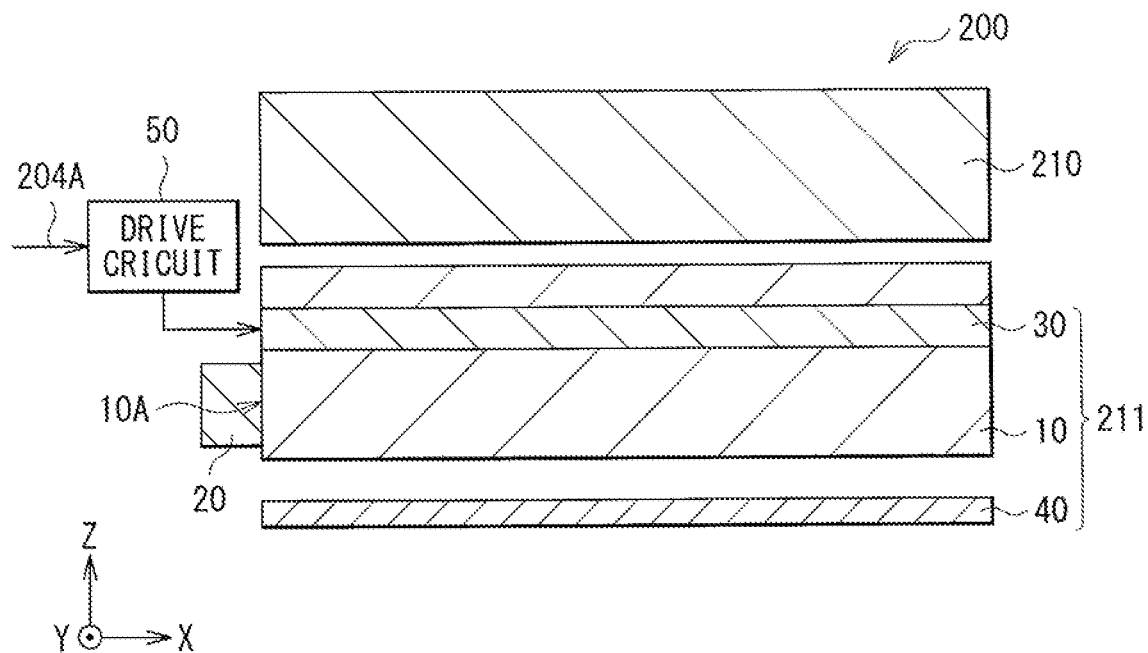
FIG. 3 is a sectional diagram illustrating an example of a structure of a display section in the receiver in FIG. 1.

FIG. 3 illustrates an example of a cross-sectional structure of the display section in the receiver 200. Note that FIG. 3 schematically illustrates the cross-sectional structure, and actual dimensions and actual shapes are not limited to the illustrated dimensions and the illustrated shapes. The receiver 200 includes the display panel 210 and the backlight 211 disposed behind the display panel 210.

The display panel 210 includes a plurality of pixels arranged two-dimensionally, and displays a picture when the respective pixels or specific pixels are driven. For example, the display panel 210 may be a transmissive liquid crystal display (LCD) panel in which the respective pixels or specific pixels are driven in response to a picture signal, and may have a structure in which a liquid crystal layer is sandwiched between a pair of transparent substrates. The display panel 210 may include, for example, a polarization plate, a transparent substrate, pixel electrodes, an alignment film, a liquid crystal layer, an alignment film, a common electrode, a color filter, a transparent substrate, and a polarization plate in order from the backlight 211 side.

Note that the polarization plate on the backlight 211 side corresponds to a polarization plate 210B (see FIG. 14) described later, and the polarization plate on a picture display surface side corresponds to a polarization plate 210C (see FIG. 14) described later. Moreover, a section (more specifically, a stacked section configured of the transparent substrate, the pixel electrodes, the alignment film, the liquid crystal layer, the alignment film, the common electrode, the color filter, and the transparent substrate) sandwiched by the pair of polarization plates in the display panel 210 corresponds to a liquid crystal panel 210A (see FIG. 14) described later.

The transparent substrate is formed of a substrate transparent to visible light, such as plate glass. Note that, although not illustrated, the transparent substrate on the backlight 211 side is provided with an active drive circuit including thin film transistors (TFTs) electrically connected to the pixel electrodes, wirings, and the like. For example, the pixel electrode and the common electrode may be formed of indium tin oxide (ITO). The pixel electrodes are two-dimensionally arranged on the transparent substrate, and each of the pixel electrodes functions as an electrode for each pixel. On the other hand, the common electrode is formed over a surface on the color filter, and functions as a common electrode facing the respective pixel electrodes. The alignment film may be formed of, for example, a polymer material such as polyimide, and performs alignment on a liquid crystal.

For example, the liquid crystal layer may be formed of a liquid crystal of vertical alignment (VA) mode, twisted nematic (TN) mode, or super twisted nematic (STN) mode, and has a function of changing a direction of a polarization axis of emitted light from the backlight 211 for each pixel, in response to a voltage applied from a drive circuit (not illustrated). Note that changing arrangement of the liquid crystal in multiple steps allows adjustment of the direction of a transmission axis for each pixel in multiple steps. The color filter is configured by arranging color filters that separate light having passed through the liquid crystal layer into three primary colors of red (R), green (G), and blue (b), or color filters that separate the light into four colors of R, G, B, and white (W), so as to correspond to the arrangement of the pixel electrodes.

The polarization plate is a kind of an optical shutter, and allows only light (polarized light) that oscillates in a certain direction to pass therethrough. Note that the polarization plate may be an absorption type polarization element absorbing light (polarized light) that oscillates in a direction other than the transmission axis, and may be preferably a reflective polarization element reflecting the light toward the backlight 211 side in terms of luminance improvement. The two polarization plates are arranged so that respective polarization axes are different from each other by 90 degrees. Accordingly, the emitted light from the backlight 211 passes through the polarization plates through the liquid crystal layer, or is shielded by the polarization plates.

For example, the backlight 211 may illuminate the display panel 210 from the backside thereof, and may include a light guide plate 10, a light source 20 disposed on a side surface of the light guide plate 10, a light modulation device 30 and a reflector 40 that are arranged behind the light guide plate 10, and a drive circuit 50 driving the light modulation device 30. Note that the light guide plate 10 corresponds to a specific example of "first transparent substrate" or "second transparent substrate" of the technology.

The light guide plate 10 guides light from the light source 20, which is disposed on the side surface of the light guide plate 10, to a top surface of the light guide plate 10. The light guide plate 10 may have a shape corresponding to the display panel 210 disposed on the top surface of the light guide plate 10, for example, a rectangular parallelepiped shape enclosed by a top surface, a bottom surface, and side surfaces. Note that, in the following description, the side surface receiving the light from the light source 20 of the side surfaces of the light guide plate 10 is referred to as a light incident surface 10A. Note that, when the luminance is uniformized through modulation of a voltage to be applied to the backlight 211, a flat light guide plate not subjected to patterning may be used as the light guide plate 10. For example, the light guide plate 10 may mainly contain a transparent thermoplastic resin such as a polycarbonate resin (PC) and an acrylic resin (polymethyl methacrylate (PMMA)).

Figure 4:
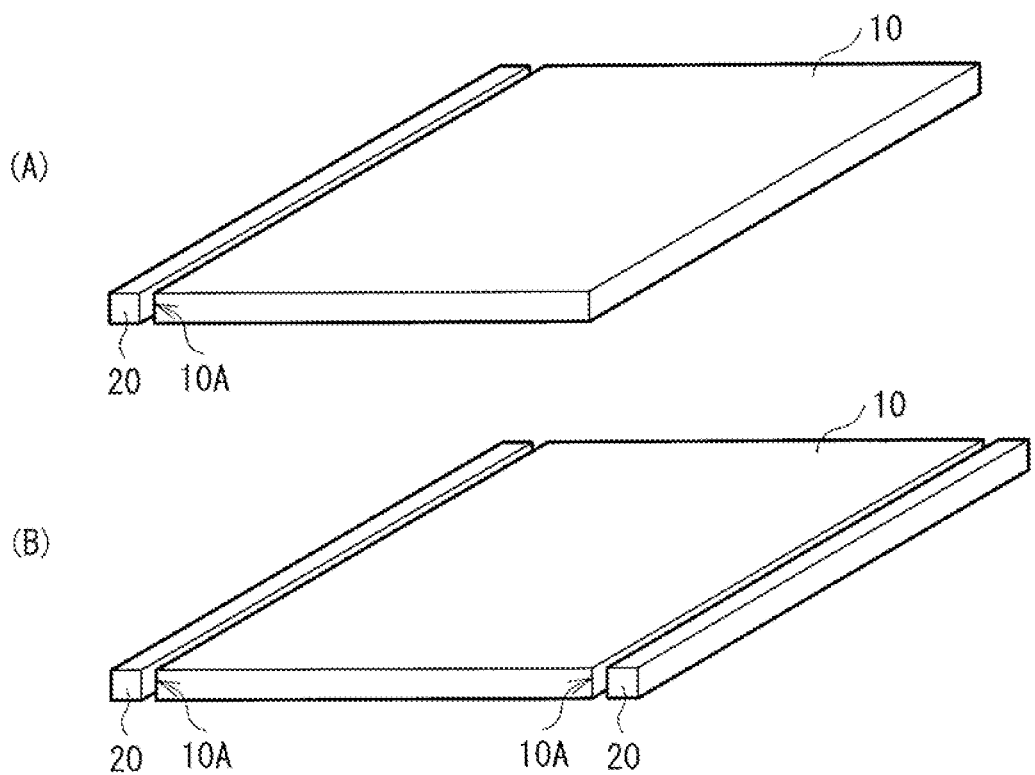
FIGS. 4A and 4B show a perspective view illustrating an example of arrangement of light source in FIG. 3.

The light source 20 is a linear light source, and for example, may be configured of a hot cathode fluorescent lamp (HCFL), a cold cathode fluorescent lamp (CCFL), or a plurality of light emitting diodes (LEDs) arranged in line. When the light source 20 is configured of a plurality of LEDs, all of the LEDs may be preferably white LEDs in terms of efficiency, thickness reduction, and uniformity. Incidentally, for example, the light source 20 may include red LEDs, green LEDs, and blue LEDs. The light source 20 may be provided on only one side surface of the light guide plate 10 (see FIG. 3 and (A) of FIG. 4), or may be provided on two side surfaces (see (B) of FIG. 4), on three side surfaces, or on all side surfaces of the light guide plate 10. In addition, in the case where the light source 20 is provided on three side surfaces or all side surfaces, only the light sources 20 provided on two side surfaces that are opposed to each other may be turned on only when partial lighting is performed, and the all light sources 20 may be turned on when entire lighting is performed.

Figure 5:
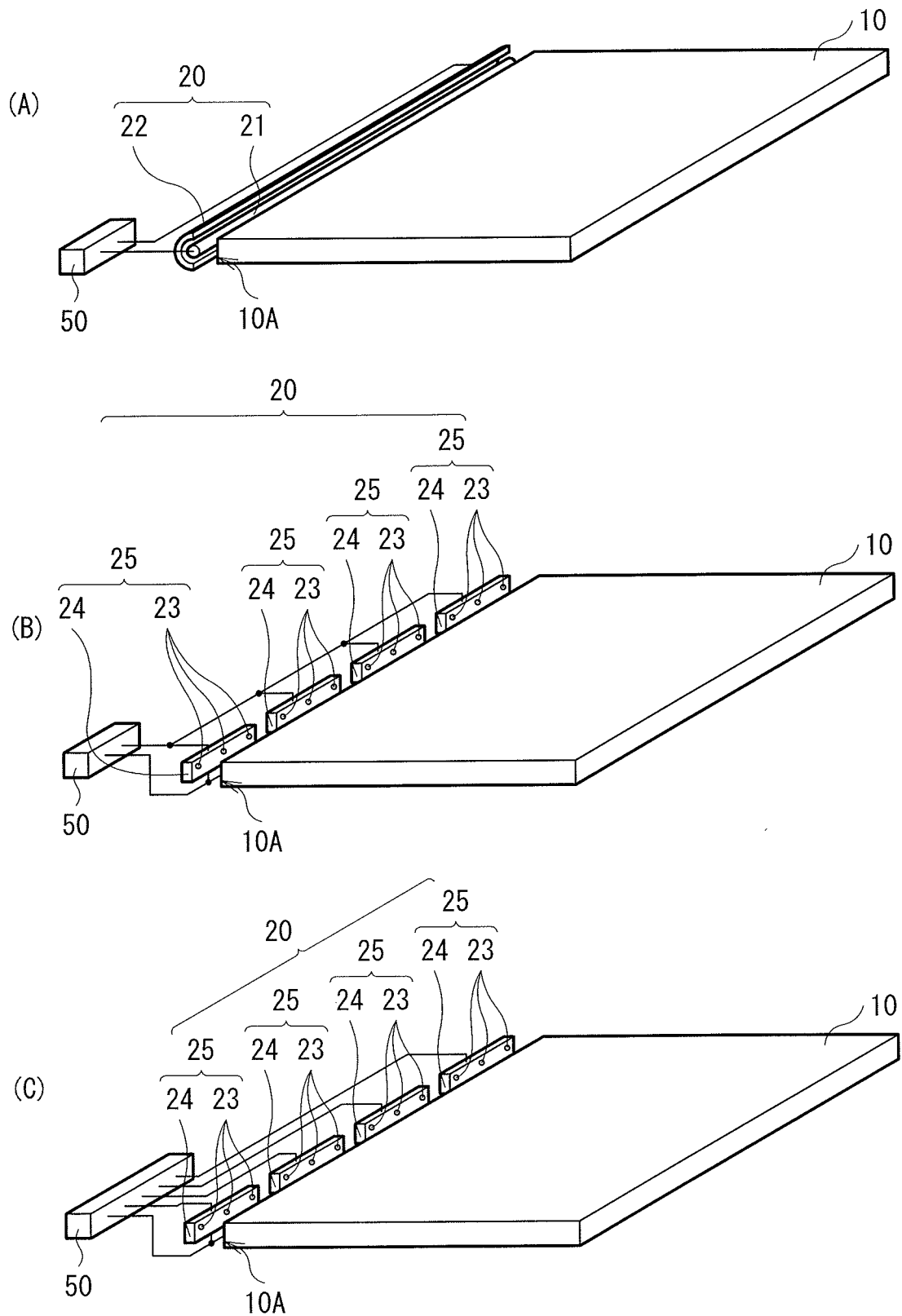
FIGS. 5A through 5C show a perspective view illustrating an example of a configuration of the light source in FIG. 3.

For example, as illustrated in (A) of FIG. 5, the light source 20 may be configured of a linear light source 21 and a reflective mirror 22. For example, the linear light source 21 may be configured of HCFL or CCFL. The reflective mirror 22 reflects, toward the light incident surface 10A, light traveling toward the direction not directly entering the light incident surface 10A, of the light emitted from the linear light source 21. For example, as illustrated in (B) or (C) of FIG. 5, the light source 20 may be configured by arranging a plurality of point light sources 23 in line. Each of the point light sources 23 emits light toward the light incident surface 10A, and may be configured of, for example, a light emitting element having an emission spot on a surface facing the light incident surface 10A. Examples of such a light emitting element may include an LED and a laser diode (LD). In terms of efficiency, thickness reduction, and uniformity, each of the point light sources 23 may be preferably a white LED. Note that the plurality of point light sources 23 included in the light source 20 may include, for example, red LEDs, green LEDs, and blue LEDs.

For example, as illustrated in (B) and (C) of FIG. 5, the plurality of point light sources 23 may be provided two by two or more on respective common substrates 24. In this case, a light source block 25 is configured of one substrate 24 and the plurality of point light sources 23 provided on the substrate 24. For example, the substrate 24 may be a circuit board provided with a wiring that electrically connects the point light sources 23 to the drive circuit 50, and each of the point light sources 23 is mounted on the circuit board. The respective point light sources 23 provided on the common substrate 24 (the respective point light sources 23 in the light source block 25) are collectively (non-independently) driven by the drive circuit 50, and for example, although not illustrated, may be connected to one another in parallel or in series. In addition, the point light sources 23 provided on different substrates 24 (the point light sources 23 in the respective light source blocks 25) may be independently driven by the drive circuit 50. At this time, for example, as illustrated in (C) of FIG. 5, the point light sources 23 provided on the different substrates 24 (the point light sources 23 in the respective light source blocks 25) may be connected to different current paths.

The reflector 40 allows light leaking from the back of the light guide plate 10 through the light modulation device 30 to return to the light guide plate 10 side, and for example, may have a function of reflection, diffusion, and scattering. This makes it possible to efficiently utilize the emitted light from the light source 20, and contributes to improvement of front luminance. For example, the reflector 40 may be formed of foamed polyethylene terephthalate (PET), an evaporated silver film, a multilayer reflective film, white PET, or the like. Note that, for example, the reflector 40 may be omitted as necessary, as will be described later.

Figure 6:
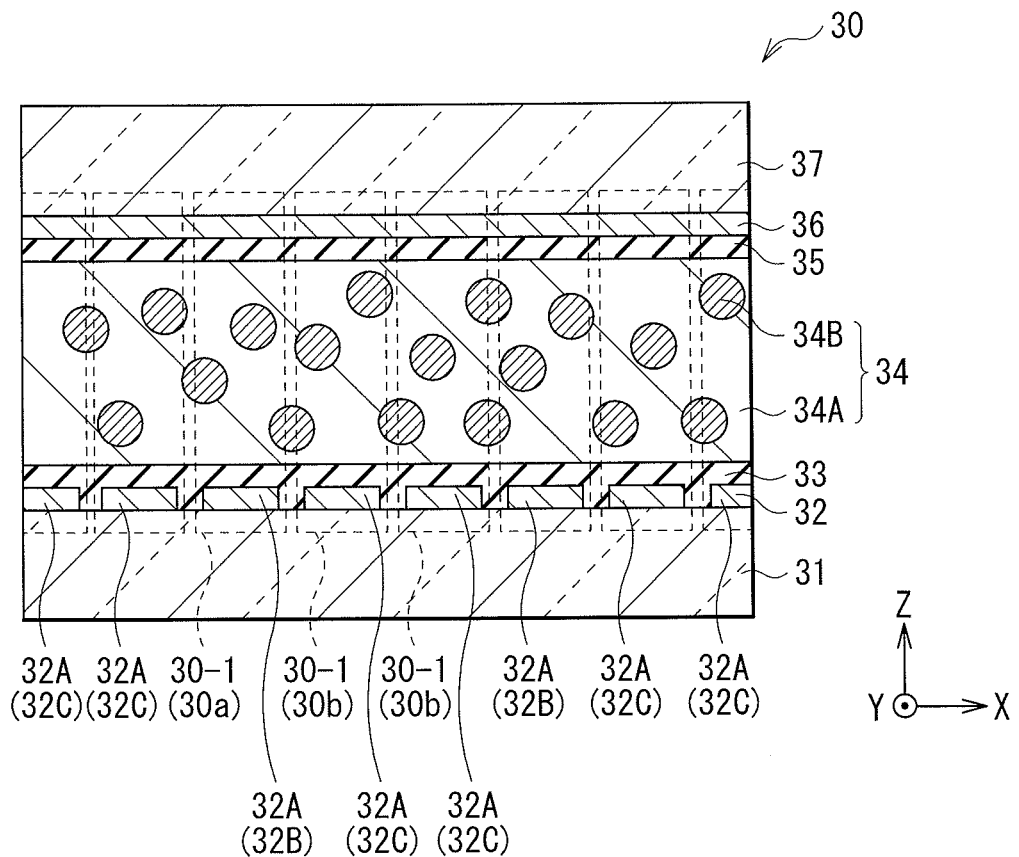
FIG. 6 is a sectional diagram illustrating an example of a structure of a light modulation device in FIG. 3.

In the present embodiment, the light modulation device 30 is provided inside the light guide plate 10. The light modulation device 30 is closely adhered to the light guide plate 10 without an air layer in between, and may be bonded to the light guide plate 10 with, for example, an adhesive layer (not illustrated) in between. For example, as illustrated in FIG. 6, the light modulation device 30 may be configured by arranging a transparent substrate 31, a lower electrode 32, an alignment film 33, a light modulation layer 34, an alignment film 35, an upper electrode 36, and a transparent substrate 37 in order from the reflector 40 side.

The transparent substrates 31 and 37 support the light modulation layer 34, and are each typically formed of a substrate transparent to visible light, such as a glass plate and a plastic film. The lower electrode 32 and the upper electrode 36 generate an electric field in the light modulation layer 34 when a voltage is applied. The lower voltage 32 is an electrode provided on the transparent substrate 31 side in relation to the light modulation layer 34, and the upper electrode 36 is an electrode provided on the transparent substrate 37 side in relation to the light modulation layer 34. Note that the lower electrode 32 corresponds to a specific example of "first electrode", and the upper electrode 36 corresponds to a specific example of "second electrode".

Figure 7:
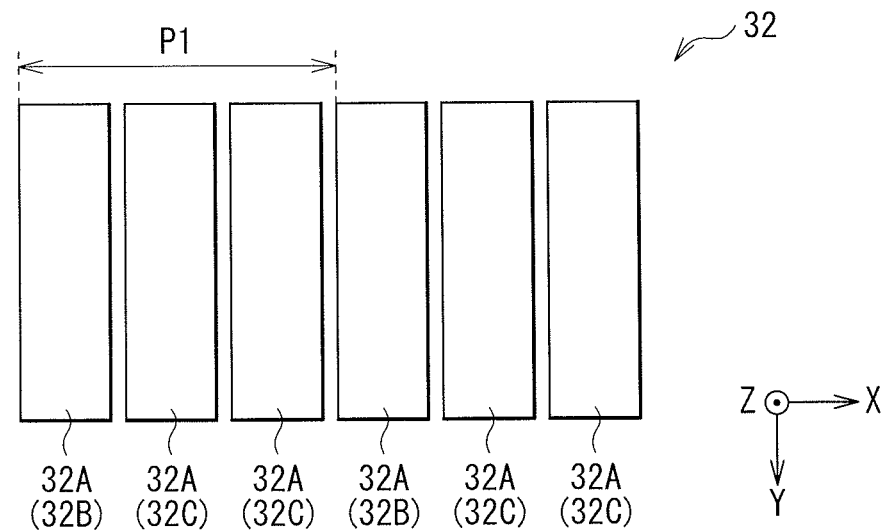
FIG. 7 is a plan view illustrating an example of a structure of a lower electrode in FIG. 6.

For example, as illustrated in FIG. 7, the lower electrode 32 is configured of a plurality of partial electrodes 32A. Each of the plurality of partial electrodes 32A has a strip shape extending in one direction in the plane (in a direction parallel to the light incident surface 10A). A specific number of partial electrodes 32A (hereinafter, referred to as "partial electrodes 32B") among the plurality of partial electrodes 32A are used to generate linear illumination light beams when three-dimensional display is performed in the receiver 200. Note that the partial electrode 32B corresponds to a specific example of "first partial electrode". A plurality of partial electrodes 32A other than the partial electrodes 32B out of the plurality of partial electrodes 32A (hereinafter, referred to as "partial electrodes 32C") are used, together with the partial electrodes 32A, to generate a planar illumination light beam when two-dimensional display is performed in the receiver 200. In other words, when the two-dimensional display is performed in the receiver 200, all of the partial electrodes 32A are used to generate the planar illumination light beam. Note that the partial electrode 32C corresponds to a specific example of "second partial electrode".

One partial electrode 32B and a plurality of partial electrodes 32C are regarded as one group, and a plurality of partial electrode groups are arranged in the arrangement direction (in the direction orthogonal to the light incident surface 10A). FIG. 7 illustrates a case where one partial electrode 32B and two partial electrodes 32C are regarded as one group and a plurality of partial electrode groups are arranged in the arrangement direction; however the breakdown of the partial electrode group is not limited to the illustration of FIG. 7. For example, the partial electrode group may be configured of one partial electrode 32B and one partial electrode 32C, or may be configured of one partial electrode 32B and three or more partial electrodes 32C.

The above-described partial electrode groups are arranged with a pitch P1 (a pitch equal to or close to a pixel pitch for performing three-dimensional display) corresponding to a pixel pitch for performing three-dimensional display in the receiver 200. In addition, likewise, the plurality of partial electrodes 32B are also arranged with the pitch P1 (a pitch equal to or close to a pixel pitch for performing three-dimensional display) corresponding to the pixel pitch for performing three-dimensional display in the receiver 200. A width of the partial electrode 32B is smaller than a width of the pixel in the display panel 210. The width of the partial electrode 32B may be preferably equal to or smaller than (the width of the pixel in the display panel 210–the thickness of the light modulation layer 34×2).

Figure 8:
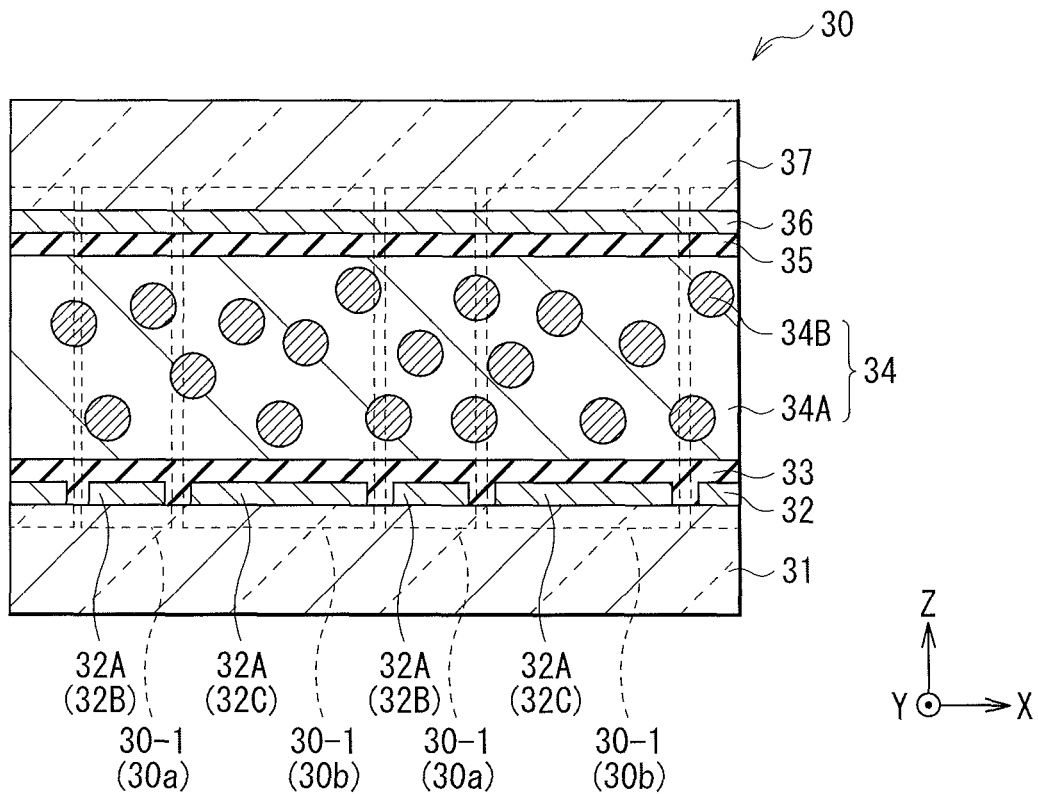
FIG. 8 is a sectional diagram illustrating another example of the structure of the light modulation device in FIG. 3.
Figure 9:
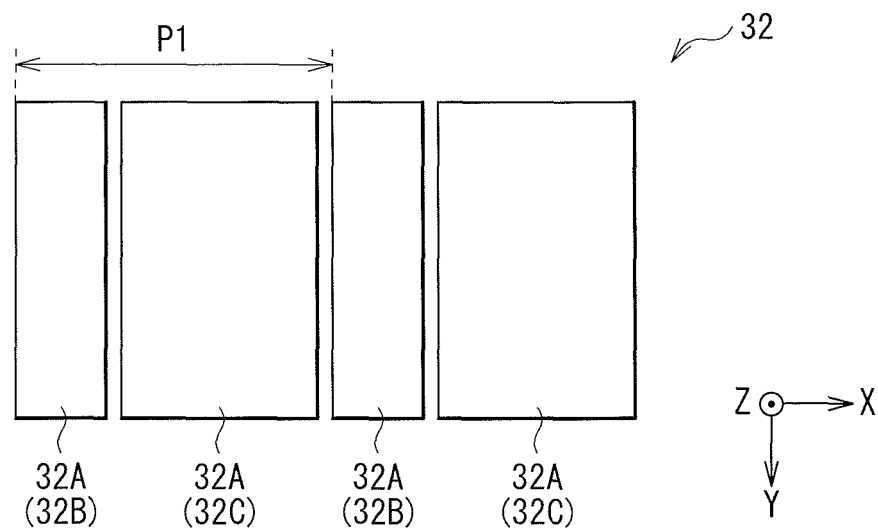
FIG. 9 is a plan view illustrating an example of a structure of a lower electrode in FIG. 8.

Note that, when the partial electrode group is configured of one partial electrode 32B and the plurality of partial electrodes 32C, a width of the partial electrode 32C may be preferably equal to the width of the partial electrode 32B. In addition, when the partial electrode group is configured of one partial electrode 32B and one partial electrode 32C, for example, as illustrated in FIG. 8 and FIG. 9, the width of the partial electrode 32C may be larger than the width of the partial electrode 32B, or although not illustrated, may be equal to the width of the partial electrode 32B.

Figure 10:
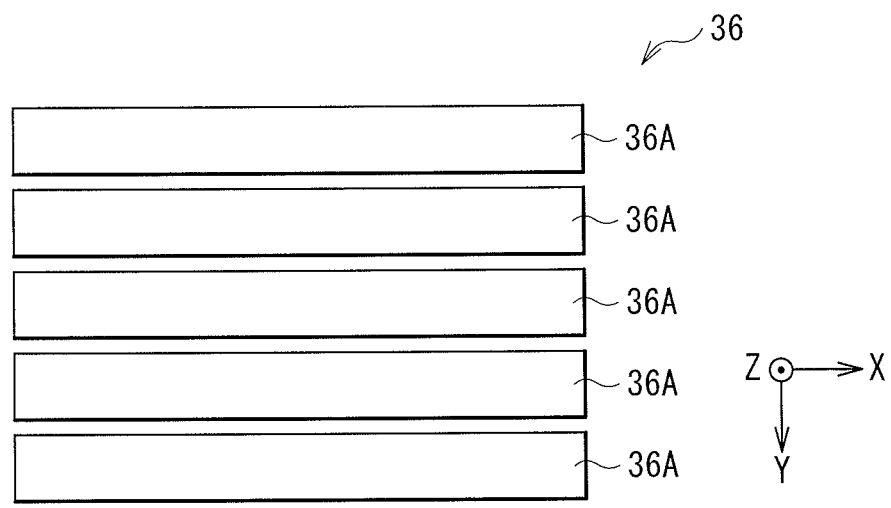
FIG. 10 is a plan view illustrating an example of a structure of an upper electrode in FIG. 6 and FIG. 8.

For example, as illustrated in FIG. 10, the upper electrode 36 is configured of a plurality of partial electrodes 36A. Each of the plurality of partial electrodes 36A has a strip shape extending in a direction intersecting (or orthogonal to) the partial electrode 32A. When the light source 20 is configured of a plurality of light source blocks 25, the plurality of partial electrodes 36A is provided one by one or multiple by multiple in regions facing the respective light source blocks 25. Incidentally, in the following description, for convenience, it is assumed that the partial electrodes 36A are provided one by one in regions facing the respective light source blocks 25.

The lower electrode 32 and the upper electrode 36 are each formed of a transparent conductive film (for example, an ITO film). Note that the lower electrode 32 and the upper electrode 36 may be formed of an indium zinc oxide (IZO), a metal nanowire, a carbon nanotube, graphene, or the like.

When the lower electrode 32 and the upper electrode 36 are viewed from the normal direction of the light modulation device 30, sections of the light modulation device 30 corresponding to parts where the lower electrode 32 and the upper electrode 36 face each other configure light modulation cells 30a and 30b (see FIG. 6). The light modulation cell 30a is a section of the light modulation device 30 corresponding to a part where the partial electrode 32B and the partial electrode 36A face each other, and the light modulation cell 30b is a section of the light modulation device 30 corresponding to a part where the partial electrode 32C and the partial electrode 36A face each other. The light modulation cell 30a and the light modulation cell 30b are adjacent to each other.

Each of the light modulation cells 30a and 30b is separately and independently driven by application of a predetermined voltage to the partial electrode 32A and the partial electrode 36A, and exhibits transparency (optical transparency) or scattering property with respect to the light from the light source 20, depending on magnitude of a potential difference applied to the partial electrode 32A and the partial electrode 36A. Note that the transparency and the scattering property will be described in detail in the description of the light modulation layer 34.

For example, the alignment films 33 and 35 may align a liquid crystal and a monomer used for the light modulation layer 34. The kinds of the alignment film may include, for example, a vertical alignment film and a horizontal alignment film, and in the present embodiment, the horizontal alignment film is used for the alignment films 33 and 35. Examples of the horizontal alignment film may include, for example, an alignment film formed through rubbing treatment on polyimide, polyamidimide, polyvinyl alcohol, and the like, and an alignment film provided with a groove shape by transcription, etching, or the like. In addition, examples of the horizontal alignment film may include, for example, an alignment film formed through oblique deposition of an inorganic material such as silicon oxide, a diamond-like carbon alignment film formed through ion beam irradiation, and an alignment film provided with electrode pattern slits.

Moreover, it is sufficient for both the vertical alignment film and the horizontal alignment film to have a function of aligning the liquid crystal and the monomer, and reliability in repeated application of a voltage desired for a typical liquid crystal display is unnecessary. This is because the reliability by voltage application after device fabrication is determined by an interface between polymerized monomer and the liquid crystal. Moreover, for example, the liquid crystal and the monomer used for the light modulation layer 34 may be allowed to be aligned also by application of an electric field or a magnetic field between the lower electrode 32 and the upper electrode 36 even when an alignment film is not used. In other words, ultraviolet irradiation during application of an electric field or a magnetic field between the lower electrode 32 and the upper electrode 36 enables fixing of alignment state of the liquid crystal and the monomer in voltage-applied state. When a voltage is used for formation of the alignment film, electrodes may be separately formed for alignment and for driving, or dual-frequency liquid crystal in which the symbol of dielectric anisotropy is inverted by frequency may be used as a liquid crystal material. Moreover, when a magnetic field is used for formation of the alignment film, a material having large magnetic susceptibility anisotropy may be preferably used as the alignment film, and for example, a material having a large number of benzene rings may be preferably used.

The light modulation layer 34 exhibits, depending on the magnitude of the electric field, scattering property or transparency to the light from the light source 20. The light modulation layer 34 exhibits transparency to the light from the light source 20 when the electric field is relatively small, and exhibits scattering property to the light from the light source 20 when the electric field is relatively large. For example, as illustrated in FIG. 6, the light modulation layer 34 may be a composite layer containing a bulk 34A and a plurality of microparticles 34B dispersed in the bulk 34A. The bulk 34A and the microparticle 34B have optical anisotropy.

Figure 11:
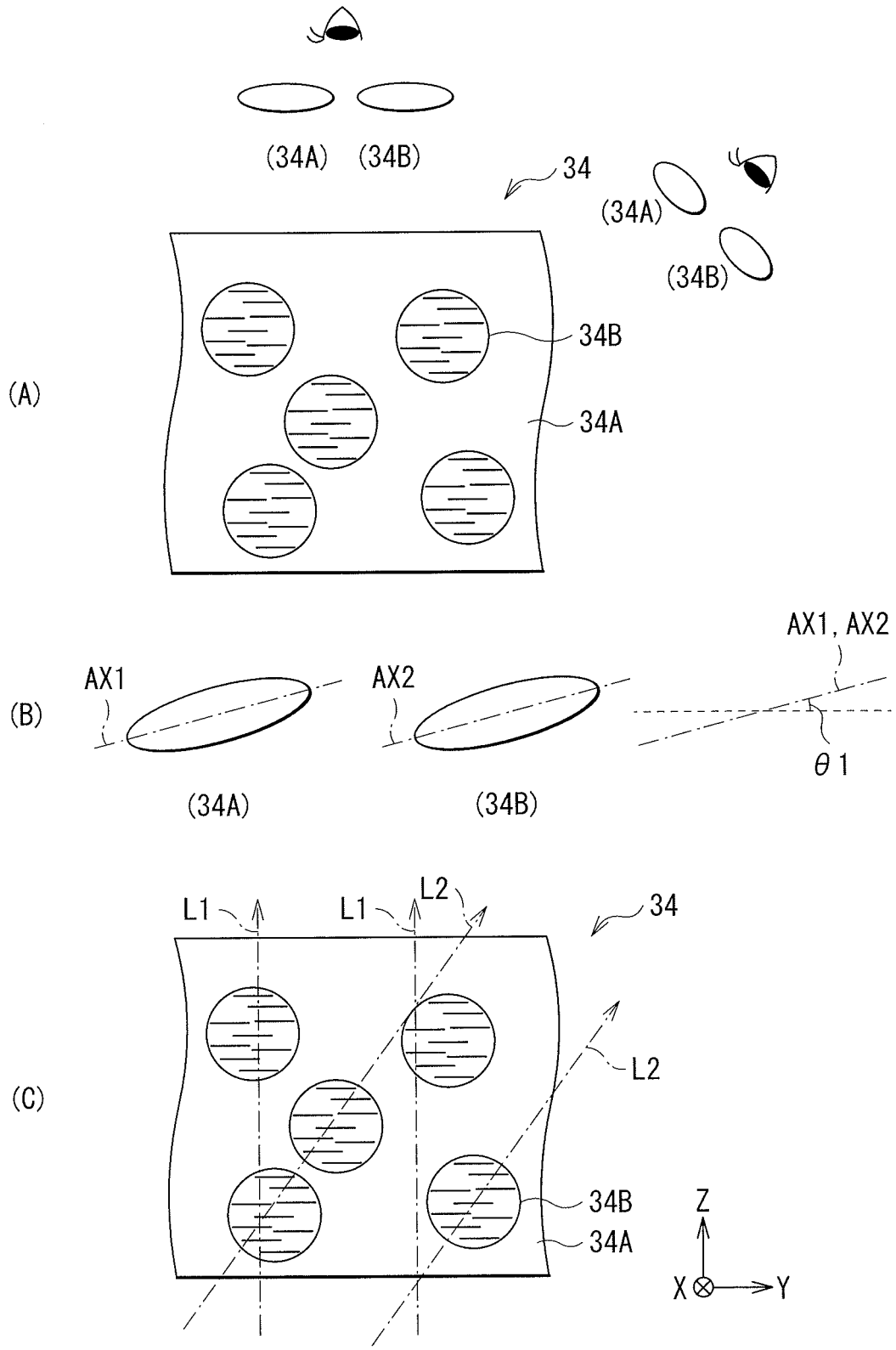
FIGS. 11A through 11C show a schematic diagram for explaining an example of a function of a light modulation layer in FIG. 6 and FIG. 8.

(A) of FIG. 11 schematically illustrates an example of the alignment state in the microparticle 34B when the potential difference is not applied between the lower electrode 32 and the upper electrode 36 (hereinafter, simply referred to as "during no-potential-difference application"). Note that illustration of the alignment state in the bulk 34A is omitted in (A) of FIG. 11. As used herein, the wording "during no-potential difference application" is a concept that encompasses a time period when a potential difference that is smaller than the potential difference allowing the light modulation layer 34 to exhibit scattering property and allows the light modulation layer 34 to exhibit transparency is applied.

(B) of FIG. 11 illustrates an example of an index ellipsoid representing refractive index anisotropy of each of the bulk 34A and the microparticle 34B during no-potential-difference application. The index ellipsoid represents a refractive index of linear polarized light entering from various directions by a tensor ellipsoid, and geometrically represents a refractive index through observation of a cross-sectional surface of the ellipsoid from an entering direction of the light. (C) of FIG. 11 schematically illustrates an example of a state where light L1 traveling toward the front direction and light L2 traveling toward oblique direction pass through the light modulation layer 34 during no-potential-difference application.

Figure 12:
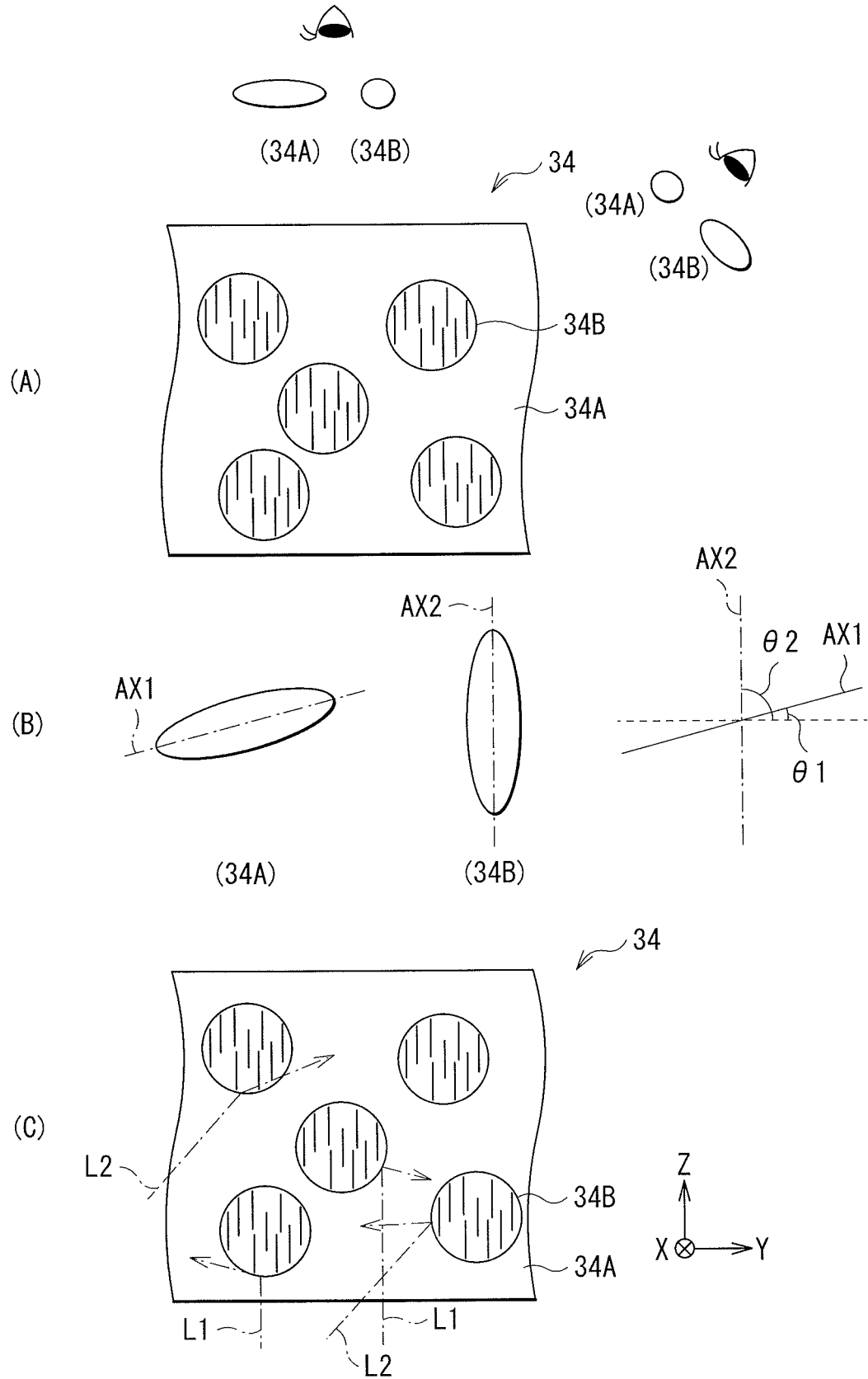
FIGS. 12A through 12C show a schematic diagram for explaining another example of the function of the light modulation layer in FIG. 6 and FIG. 8.

(A) of FIG. 12 schematically illustrates an example of the alignment state in the microparticle 34B when the potential difference is applied between the lower electrode 32 and the upper electrode 36 (hereinafter, simply referred to as "during potential-difference application"). Note that illustration of the alignment state in the bulk 34A is omitted in (A) of FIG. 12. As used herein, the wording "during potential-difference application" refers to a time period when the potential difference allowing the light modulation layer to exhibit scattering property is applied.

(B) of FIG. 12 illustrates an example of the index ellipsoid representing refractive index anisotropy of each of the bulk 34A and the microparticle 34B during potential-difference application. (C) of FIG. 12 schematically illustrates an example of a state where the light L1 traveling toward the front direction and the light L2 traveling toward the oblique direction are scattered in the light modulation layer 34, during potential-difference application.

For example, as illustrated in (A) and (B) of FIG. 11, the bulk 34A and the microparticle 34B have configuration in which a direction of an optical axis AX1 of the bulk 34A and a direction of an optical axis AX2 of the microparticle 34B are coincident with (parallel to) each other during no-potential-difference application. Incidentally, the optical axes AX1 and AX2 each indicate a line parallel to a traveling direction of a light beam having a fixed refractive index irrespective of polarization direction. In addition, it is unnecessary for the direction of the optical axis AX1 and the direction of the optical axis AX2 to constantly coincide with each other, and the direction of the optical axis AX1 may be deviated in some degree from the direction of the optical axis AX2 due to, for example, manufacturing error.

Moreover, for example, the microparticle 34B may have a configuration in which the optical axis AX2 is parallel to the light incident surface 10A of the light guide plate 10 during no-potential-difference application. Further, for example, the microparticle 34B may have a configuration in which the optical axis AX2 intersects the surfaces of the transparent substrates 31 and 37 at a slight angle $\theta 1$ during no-potential-difference application (see (B) of FIG. 11). Note that the angle $\theta 1$ will be described in detail in description of a material forming the microparticle 34B.

On the other hand, for example, the bulk 34A may have a configuration in which the optical axis AX1 of the bulk 34A is fixed irrespective of potential difference application between the lower electrode 32 and the upper electrode 36. Specifically, for example, as illustrated in (A) and (B) of FIG. 11 and (A) and (B) of FIG. 12, the bulk 34A may have a configuration in which the optical axis AX1 of the bulk 34A is parallel to the light incident surface 10A of the light guide plate 10 as well as intersects the surfaces of the transparent substrates 31 and 37 at the predetermined angle $\theta 1$. In other words, the optical axis AX1 of the bulk 34A is parallel to the optical axis AX2 of the microparticle 34B during no-potential-difference application.

Note that it is unnecessary for the optical axis AX2 to be constantly parallel to the light incident surface 10A as well as to constantly intersect the surfaces of the transparent substrates 31 and 37 at the angle $\theta 1$, and the optical axis AX2 may intersect the surfaces of the transparent substrates 31 and 37 at an angle slightly different from the angle $\theta 1$ due to, for example, manufacturing error. In addition, it is unnecessary for the optical axes AX1 and AX2 to be constantly parallel to the light incident surface 10A, and the optical axes AX1 and AX2 may intersect the light incident surface 10A at a small angle due to, for example, manufacturing error.

Figure 13:
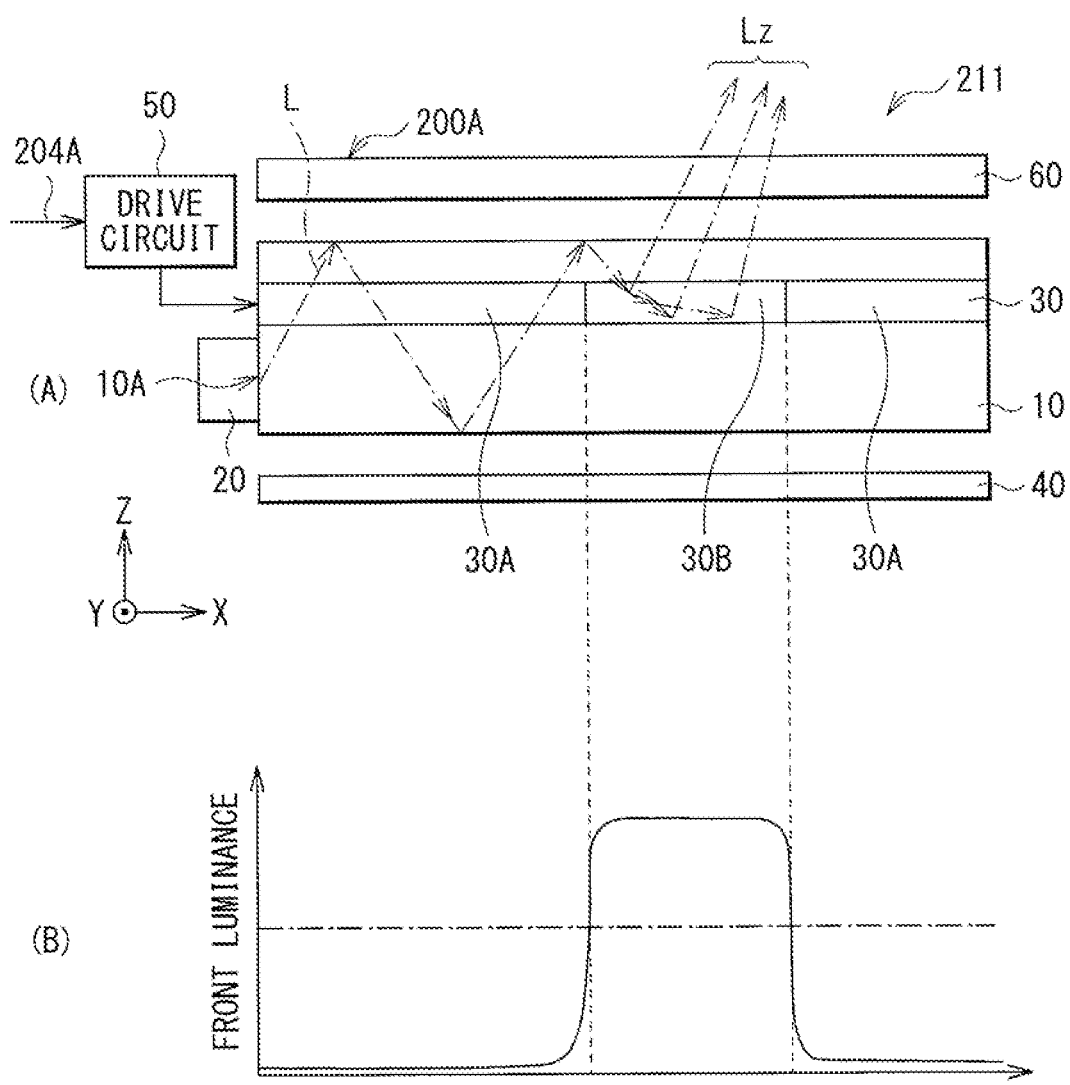
FIGS. 13A and 13B show a schematic diagram for explaining an example of a function of a backlight in FIG. 3.

At this time, it may be preferable that an ordinary refractive index of the bulk 34A be equal to that of the microparticle 34B, and an extraordinary refractive index of the bulk 34A be equal to that of the microparticle 34B. In this case, for example, as illustrated in (A) of FIG. 11, during no-potential-difference application, refractive index difference is substantially eliminated in various directions including the front direction and the oblique direction, and high transparency (light transparency) is obtainable. Therefore, for example, as illustrated in (C) of FIG. 11, the light L1 traveling toward the front direction and the light L2 traveling toward the oblique direction are not scattered in the light modulation layer 34, and pass through the light modulation layer 34. As a result, for example, as illustrated in (A) and (B) of FIG. 13, light L from the light source 20 (light from the oblique direction) is totally reflected by an upper interface and a lower interface of a transparent region (a transmissive region 30A) of the light modulation layer 34, and luminance of the transmissive region 30A (luminance of black display) is decreased as compared with the case where light is uniformly emitted from the entire surface (alternate long and short dash line in (B) of FIG. 13). Note that profile of front luminance in (B) of FIG. 13 is obtained by providing a diffuser sheet 60 on the light guide plate 10 and performing measurement through the diffuser sheet 60.

Note that the top surface of the light guide plate 10 that is one of interfaces of the transmissive region 30A is in contact with a clearance existing between the display panel 210 and the light guide plate 10, and the clearance may be preferably filled with a material having a refractive index lower than that of the top surface of the light guide plate 10. Although the layer formed of such a low-refractive-index material is typically air, the layer may be an adhesive agent or a bonding agent formed of a low-refractive-index material.

For example, as illustrated in (A) and (B) of FIG. 12, during potential-difference application, the bulk 34A and the microparticle 34B may have a configuration in which the direction of the optical axis AX1 is different from (intersects or is substantially orthogonal to) the direction of the optical axis AX2. Moreover, for example, during potential-difference application, the microparticle 34B may have a configuration in which the optical axis AX2 of the microparticle 34B is parallel to the light incident surface 10A of the light guide plate 10 as well as intersects the surfaces of the transparent substrates 31 and 37 at an angle θ2 (for example, 90 degrees) larger than the angle θ1. Note that the angle θ2 will be described in detail in description of a material forming the microparticle 34B.

Therefore, during potential-difference application, in the light modulation layer 34, the refractive index is increased in various directions including the front direction and the oblique direction, and higher scattering property is obtainable. Accordingly, for example, as illustrated in (C) of FIG. 12, the light L1 traveling toward the front direction and the light L2 traveling toward the oblique direction is scattered in the light modulation layer 34. As a result, for example, as illustrated in (A) of FIG. 13, the light L from the light source 20 (the light from the oblique direction) passes through the upper interface and the lower interface of the region exhibiting the scattering property (the scattering region 30B) of the light modulation layer 34, and the light that has passed to the reflector 40 side is reflected by the reflector 40 and then passes through the light modulation device 30. Consequently, the luminance of the scattering region 30B is extremely high as compared with the case where light is uniformly emitted from the entire surface (alternate long and short dash line in (B) of FIG. 13), and luminance of partial white display (luminance enhancement) is increased by a decreased amount of the luminance of the transmissive region 30A.

Incidentally, the ordinary refractive index of the bulk 34A may be slightly different from that of the microparticle 34B due to, for example, manufacturing error, and for example, the difference therebetween may be preferably 0.1 or less, and more preferably 0.05 or less. In addition, the extraordinary refractive index of the bulk 34A may also be slightly different from that of the microparticle 34B due to, for example, manufacturing error, and for example, the difference therebetween may be preferably 0.1 or less, and more preferably 0.05 or less.

In addition, the difference in refractive index ($\Delta n_P$=the extraordinary refractive index $ne_P$–the ordinary refractive index $no_P$) of the bulk 34A and the difference in refractive index ($\Delta n_L$=the extraordinary refractive index $ne_L$–the ordinary refractive index $no_L$) of the microparticle 34B may be preferably as large as possible, preferably 0.05 or more, and more preferably 0.1 or more, and still more preferably 0.15 or more. This is because when the difference in refractive index of each of the bulk 34A and the microparticle 34B is large, the scattering power of the light modulation layer 34 is increased to easily disrupt light guiding condition, and the light from the light guide plate 10 is easily extracted.

Moreover, a response speed to the electric field of the bulk 34A is different from that of the microparticle 34B. The bulk 34A may have, for example, a streaky structure, a porous structure, or a rod-like structure, that has a response speed lower than that of the microparticle 34B. For example, the bulk 34A may be formed of a polymer material obtained through polymerization of a low-molecular monomer. For example, the bulk 34A may be formed by polymerizing a material (for example, monomer) that is aligned along the alignment direction of the microparticle 34B or the alignment direction of the alignment films 33 and 35 and has alignment property and polymerizability, by heat or light or both.

For example, the streaky structure, the porous structure, or the rod-like structure of the bulk 34A may have a long axis in a direction that is parallel to the light incident surface 10A of the light guide plate 10 and intersects the surfaces of the transparent substrates 31 and 37 at the slight angle θ1. When the bulk 34A has the streaky structure, an average size of the streaky tissue in a short axis direction may be preferably 0.1 µm or more and 10 µm or less, and more preferably 0.2 µm or more and 2.0 µm or less, in terms of improving scattering property of guided light. When the average size of the streaky tissue in the short axis direction is 0.1 µm or more and 10 µm or less, the scattering power in the light modulation device 30 is substantially equivalent in a visible region of 380 to 780 nm both inclusive. Therefore, only increase or decrease of light of a specific wavelength component does not occur in the plane, and thus balance in the visible region is achieved in the plane. When the average size of the streaky tissue in the short axis direction is smaller than 0.1 µm or larger than 10 µm, the scattering power of the light modulation device 30 is low irrespective of the wavelength, and thus it is difficult for the light modulation device 30 to function as a light modulation device.

Moreover, in terms of reducing wavelength dependency of scattering, the average size of the streaky tissue in the short axis direction may be preferably 0.5 µm or more and 5 µm or less, and more preferably within a range of 1 to 3 µm both inclusive. In such a case, when the light emitted from the light source 20 repeatedly passes through the bulk 34A in the light modulation device 30 during propagation of the light in the light guide plate 10, the wavelength dependency of the scattering in the bulk 34A is suppressed. The size of the streaky tissue is observable under a polarizing microscope, a confocal microscope, an electron microscope, and the like.

On the other hand, for example, the microparticle 34B may contain a liquid crystal material mainly, and have a response speed sufficiently higher than that of the bulk 34A. The liquid crystal material (a liquid crystal molecule) contained in the microparticle 34B may be, for example, a rod-like molecule. As the liquid crystal molecule contained in the microparticle

34B, a liquid crystal molecule having positive dielectric constant anisotropy (so-called positive liquid crystal) may be preferably used.

In this example, during no-potential-difference application, in the microparticle 34B, the long axis direction of the liquid crystal molecule is parallel to the optical axis AX1. At this time, the long axis of the liquid crystal molecule in the microparticle 34B is parallel to the light incident surface 10A of the light guide plate 10 and intersects the surfaces of the transparent substrates 31 and 37 at the slight angle θ1. In other words, the liquid crystal molecule in the microparticle 34B is aligned in a state of being inclined at the angle θ1 in a plane parallel to the light incident surface 10A of the light guide plate 10 during no-potential-difference application. The angle θ1 is a so-called pretilt angle, and for example may be preferably 0.1 degree or more and 30 degrees or less. The angle θ1 may be more preferably 0.5 degree or more and 10 degrees or less, and still more preferably 0.7 degree or more and 2 degrees or less. There is a tendency for scattering to decrease in efficiency due to reasons described below when the angle θ1 is large. In addition, the azimuth in which the liquid crystal stands up during potential-difference application is varied when the angle θ1 is excessively small. For example, the liquid crystal may even stand up in an azimuth changed by 180 degrees (reversed tilt). Accordingly, the refractive index difference of the microparticle 34B and that of the bulk 34A are not efficiently used, and thus there is a tendency of decrease in scattering efficiency and in luminance.

Moreover, during potential-difference application, in the microparticle 34B, the long axis direction of the liquid crystal molecule intersects or is orthogonal to (or is substantially orthogonal to) the optical axis AX1. At this time, the long axis of the liquid crystal molecule in the microparticle 34B is parallel to the light incident surface 10A of the light guide plate 10 and intersects the surfaces of the transparent substrates 31 and 37 at the angle θ2 (for example, 90 degrees) larger than the angle θ1. In other words, the liquid crystal molecule in the microparticle 34B is aligned in a state of being inclined by the angle θ2 in the plane parallel to the light incident surface 10A of the light guide plate 10 or in a state of erecting at the angle θ2 (=90°), during potential-difference application.

As the above-described monomer having the alignment property and the polymerizability, although a material that has optical anisotropy and is capable of being combined with a liquid crystal is sufficient, in the present embodiment, a low-molecular monomer to be cured by ultraviolet ray may be preferable. Since it may be preferable that the direction of optical anisotropy of the liquid crystal coincide with the direction of the optical anisotropy of the material (polymer material) formed through polymerization of the low-molecular monomer in the state of no-potential-difference application, the liquid crystal and the low-molecular monomer may be preferably aligned in the same direction before ultraviolet curing. In the case where a liquid crystal is used as the microparticle 34B, when the liquid crystal is a rod-like molecule, it may be preferable that the shape of the monomer material to be used also have a rod-like shape. As described above, it may be preferable to use a material having both polymerizability and liquid crystallinity as a monomer material, and the material may preferably contain, as a polymerizable functional group, one or more functional groups selected from the group of an acrylate group, a methacrylate group, an acryloyloxy group, a methacryloyloxy group, a vinyl ether group, and an epoxy group. These functional groups may be polymerized by irradiation of an ultraviolet ray, an infrared ray, or an electron beam, or heating. To suppress deterioration in alignment degree at the time of ultraviolet irradiation, a polyfunctionalized liquid crystal material may be added. When the bulk 34A has the above-described streaky structure, bifunctional liquid-crystalline monomer may be preferably used as a raw material of the bulk 34A. Moreover, monofunctional monomer may be added in order to adjust temperature exhibiting liquid crystallinity or tri- or more-functional monomer may be added in order to improve crosslink density, to the raw material of the bulk 34A.

Figure 14:
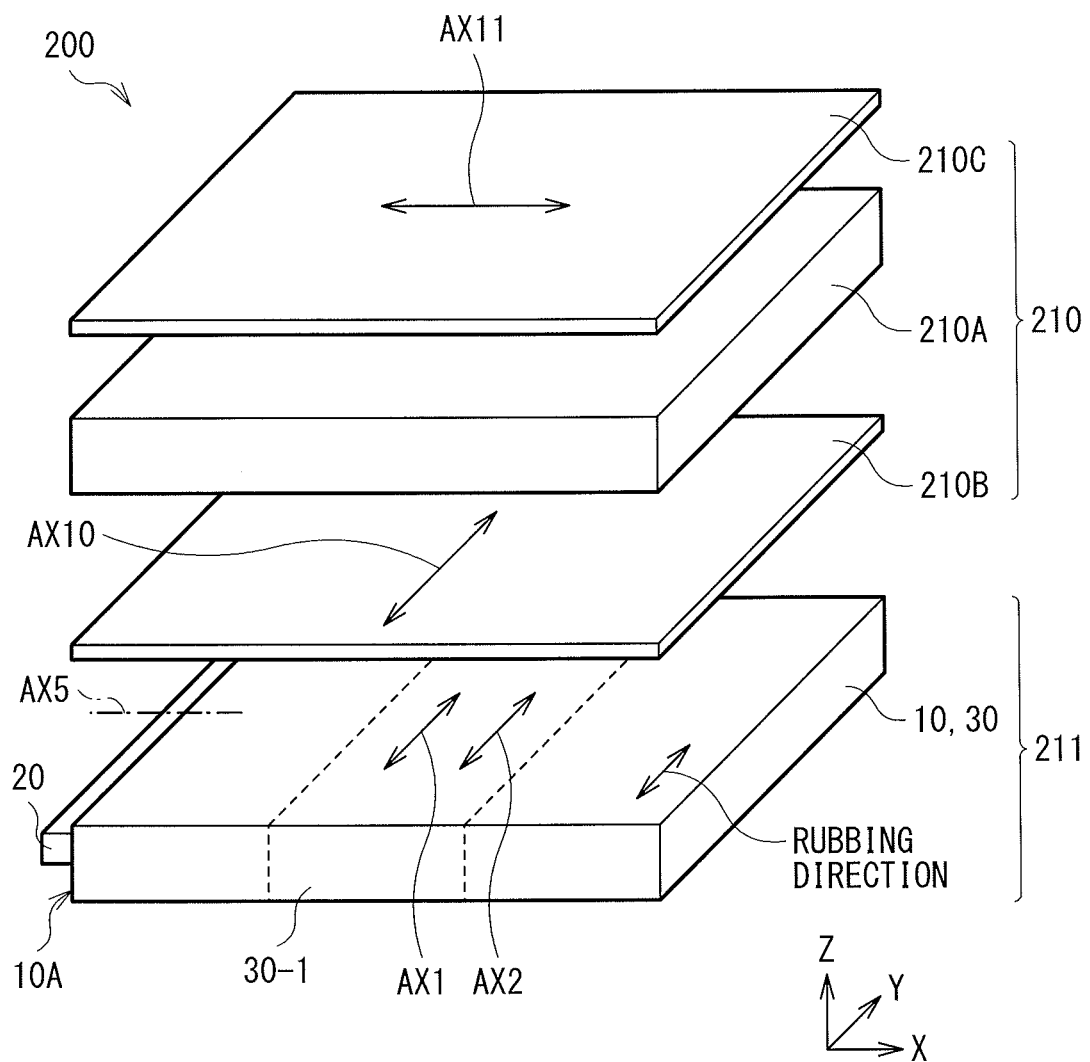
FIG. 14 is a perspective view illustrating an example of relationship between polarization direction of illumination light and a polarization axis of a polarization plate on a lower side of a display panel.

Incidentally, as described above, during no-potential-difference application, the optical axis AX1 of the bulk 34A and the optical axis AX2 of the microparticle 34B both have a component of the respective optical axes mainly in the same direction. During no-potential-difference application, as illustrated in FIG. 14, both the optical axes AX1 and AX2 face in the same direction, for example, in a rubbing direction of the alignment films 33 and 35. In addition, during no-potential-difference application, the optical axes AX1 and AX2 are parallel to or substantially parallel to the light incident surface 10A as illustrated in FIG. 14. Further, during no-potential-difference application, the optical axes AX1 and AX2 are parallel to or substantially parallel to the transparent substrate 31 as illustrated in FIG. 14. In other words, during no-potential-difference application, the optical axes AX1 and AX2 roughly face in the Y-axis direction in FIG. 14.

Further, during no-potential-difference application, the optical axes AX1 and AX2 have a component of the respective optical axes mainly in a direction parallel to a transmission axis AX10 of a polarization plate 210B on the backlight 211 side. During no-potential-difference application, the optical axes AX1 and AX2 face in the direction parallel to the transmission axis AX10, for example, as illustrated in FIG. 14. The transmission axis AX10 faces in the rubbing direction of the alignment films 33 and 35, for example, as illustrated in FIG. 14. Note that a transmission axis AX11 of the polarization plate 210C on the picture display surface side is orthogonal to the transmission axis AX10 of the polarization plate 210B on the backlight 211 side.

Figure 15:
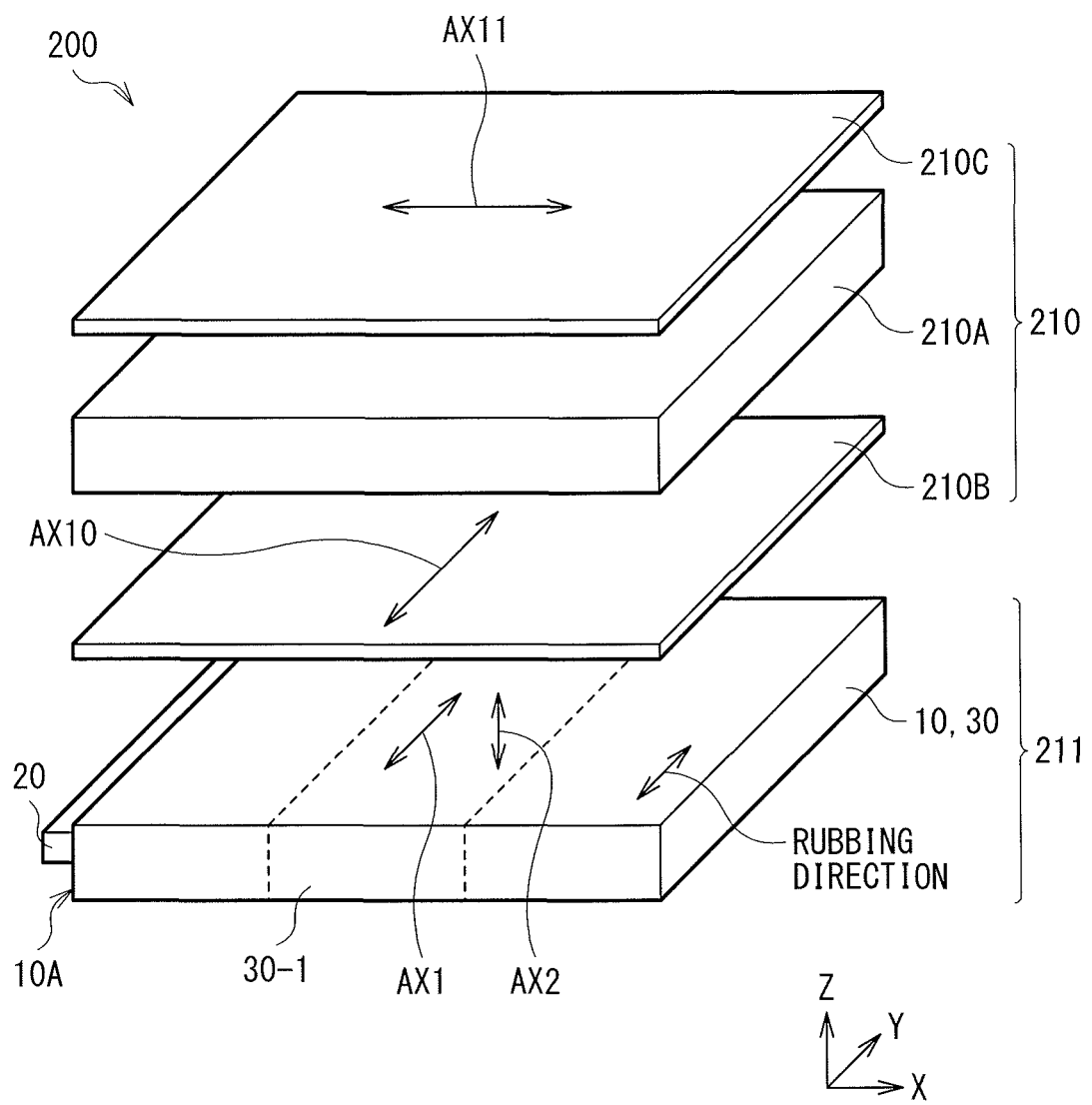
FIG. 15 is a perspective view illustrating another example of the relationship between the polarization direction of the illumination light and the polarization axis of the polarization plate on the lower side of the display panel.

Moreover, as described above, during potential-difference application, the optical axis AX1 faces in the direction same as or substantially same as the direction during no-potential-difference application. During potential-difference application, the optical axis AX1 contains the component of the optical axis mainly in the direction parallel to the transmission axis AX10 of the polarization plate 210B, and for example, as illustrated in FIG. 15, the optical axis AX1 faces in the direction parallel to the transmission axis AX10. During potential-difference application, for example, the optical axis AX1 is parallel to or substantially parallel to the light incident surface 10A, and further is parallel to or substantially parallel to the transparent substrate 31.

On the other hand, during potential-difference application, the optical axis AX2 is displaced in a predetermined direction due to influence of an electric field generated by the potential difference that is applied to the lower electrode 32 and the upper electrode 36. For example, during potential-difference application, the optical axis AX2 intersects or is orthogonal to (or substantially orthogonal to) the transparent substrate 31 as illustrated in FIG. 15. In other words, the optical axis AX2 is displaced (namely, stands up) in a direction where an angle formed by the optical axis AX2 and a normal of the transparent substrate 31 is decreased, by the potential difference application to the lower electrode 32 and the upper electrode 36. At this time, the optical axis AX2 is orthogonal to or substantially orthogonal to the optical axis AX1, and is orthogonal to or substantially orthogonal to the transparent substrate 31.

For example, the drive circuit 50 may control the magnitude of the potential difference applied to a pair of electrodes (the partial electrode 32A and the partial electrode 36A) in each of the light modulation cells 30a and 30b so that the optical axis AX2 of the microparticle 34B is parallel to or substantially parallel to the optical axis AX1 of the bulk 34A in the light modulation cell 30b and the optical axis AX2 of the microparticle 34B intersects or is orthogonal to the optical axis AX1 of the bulk 34A in the light modulation cell 30a. Moreover, for example, the drive circuit 50 may control the magnitude of the potential difference applied to the pair of electrodes (the partial electrode 32A and the partial electrode 36A) in each of the light modulation cells 30a and 30b so that the optical axis AX2 of the microparticle 34B intersects or is orthogonal to the optical axis AX1 of the bulk 34A in each of the light modulation cells 30a and 30b. In other words, the drive circuit 50 allows the directions of the optical axes AX1 and AX2 of the bulk 34A and the microparticle 34B to coincide (or substantially coincide) with each other or to be different from each other (or be orthogonal to each other) through electric field control.

When receiving a signal specifying three-dimensional display as the control signal 204A, the drive circuit 50 allows the backlight 211 to output a plurality of linear illumination light beams. More specifically, the drive circuit 50 applies a potential difference allowing the light modulation layer 34 to exhibit scattering property, to the light modulation cell 30a including the partial electrode 32B, and applies a potential difference allowing the light modulation layer 34 to exhibit transparency, to the light modulation cell 30b including the partial electrode 32C. In other words, the drive circuit 50 controls the magnitude of the potential difference applied to the pair of electrodes (the partial electrode 32A and the partial electrode 36A) in each of the light modulation cells 30a and 30b so that the optical axis AX2 of the microparticle 34B intersects the optical axis AX1 of the bulk 34A in each of the light modulation cells 30a included in the backlight 211 and the optical axis AX2 of the microparticle 34B is parallel to the optical axis AX1 of the bulk 34A in each of the light modulation cells 30b included in the backlight 211.

Figure 16:
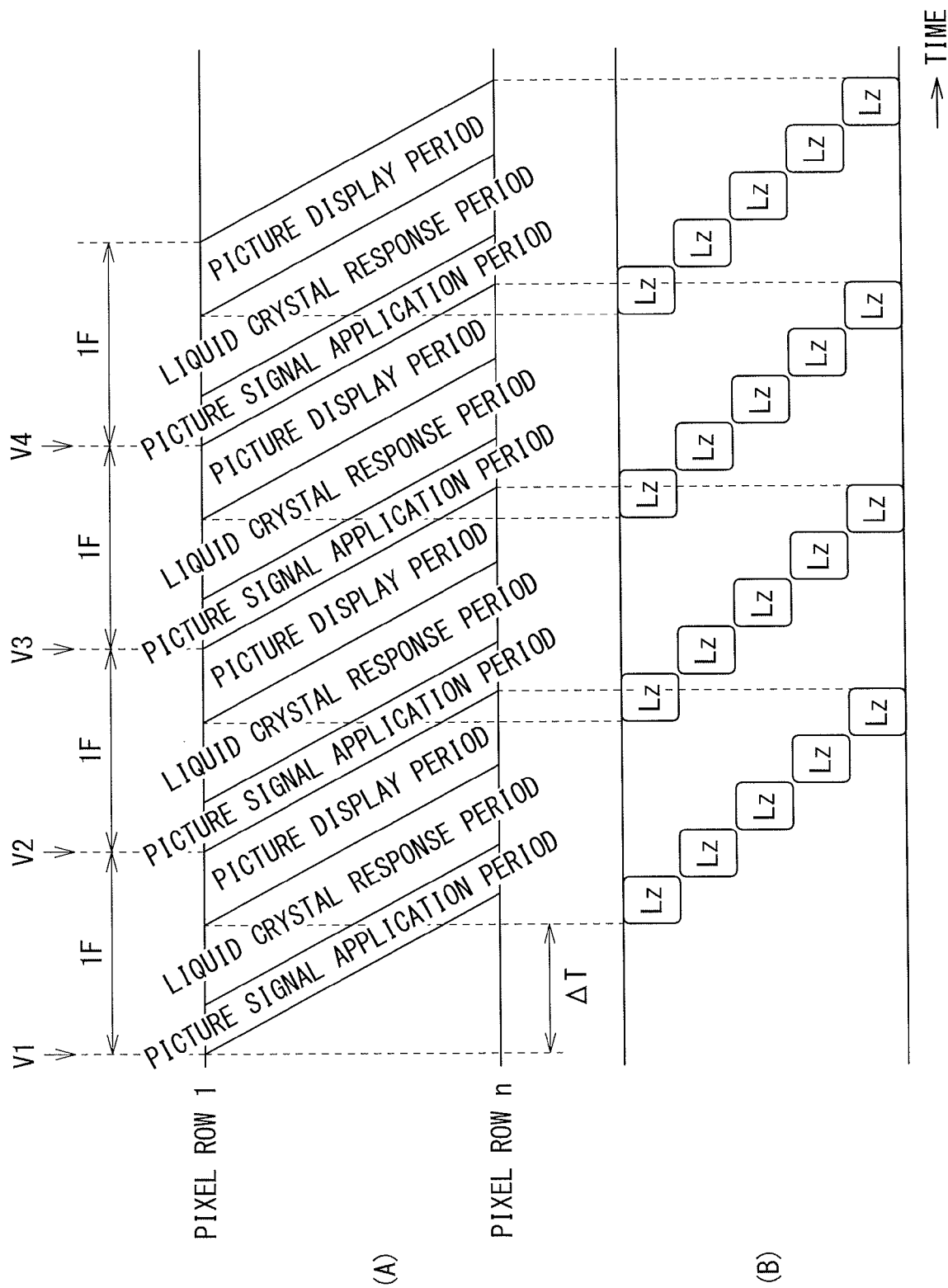
FIGS. 16A and 16B show a diagram illustrating an example of relationship between scanning of the display panel and scanning of illumination light beams of a backlight.

FIG. 16 illustrates an example of relationship between scanning of the display panel 210 and scanning of illumination light beams of the backlight 211 in three-dimensional display. As illustrated in (A) of FIG. 16, the panel drive circuit 209 sequentially scans the pixel rows from a first pixel row to an n-th pixel row, and applies, to the respective pixel rows, a picture signal for one pixel row including a plurality of two-dimensional picture signals with different perspectives. At this time, the panel drive circuit 209 sequentially applies the picture signals V1, V2, V3, and V4 for each one frame period (1F).

On the other hand, as illustrated in (B) of FIG. 16, the drive circuit 50 performs scanning of linear illumination light beams Lz (partial illumination light beams) of the backlight 211 in synchronization with the scanning of the display panel 210. More specifically, the drive circuit 50 drives the light modulation device 30 in synchronization with the output of the selection signal to the display panel 210, to generate the plurality of scattering regions 30B in regions of the light modulation layer 34 corresponding to the pixel row that is selected by the selection signal, and allows the display panel 210 to display a three-dimensional image with use of the linear illumination light beams Lz (illumination light beams) output from the respective scattering regions 30B.

After a predetermined period is elapsed from a time selected by the selection signal, the drive circuit 50 generates the plurality of scattering regions 30B (or the linear illumination light beams Lz) in regions corresponding to the pixel row that is selected by the selection signal. In this case, "predetermined period" indicates a period $\Delta T$ from start time of picture signal application until the alignment of the liquid crystal become stable and a picture according to the picture signal is allowed to be displayed, as illustrated in FIG. 16. The drive circuit 50 generates the plurality of scattering regions 30B (or the linear illumination light beams Lz) in regions corresponding to the pixel row that is selected by the selection signal, during a period after the predetermined period is elapsed from a time selected by the selection signal until a time selected by a next selection signal.

Figure 17:
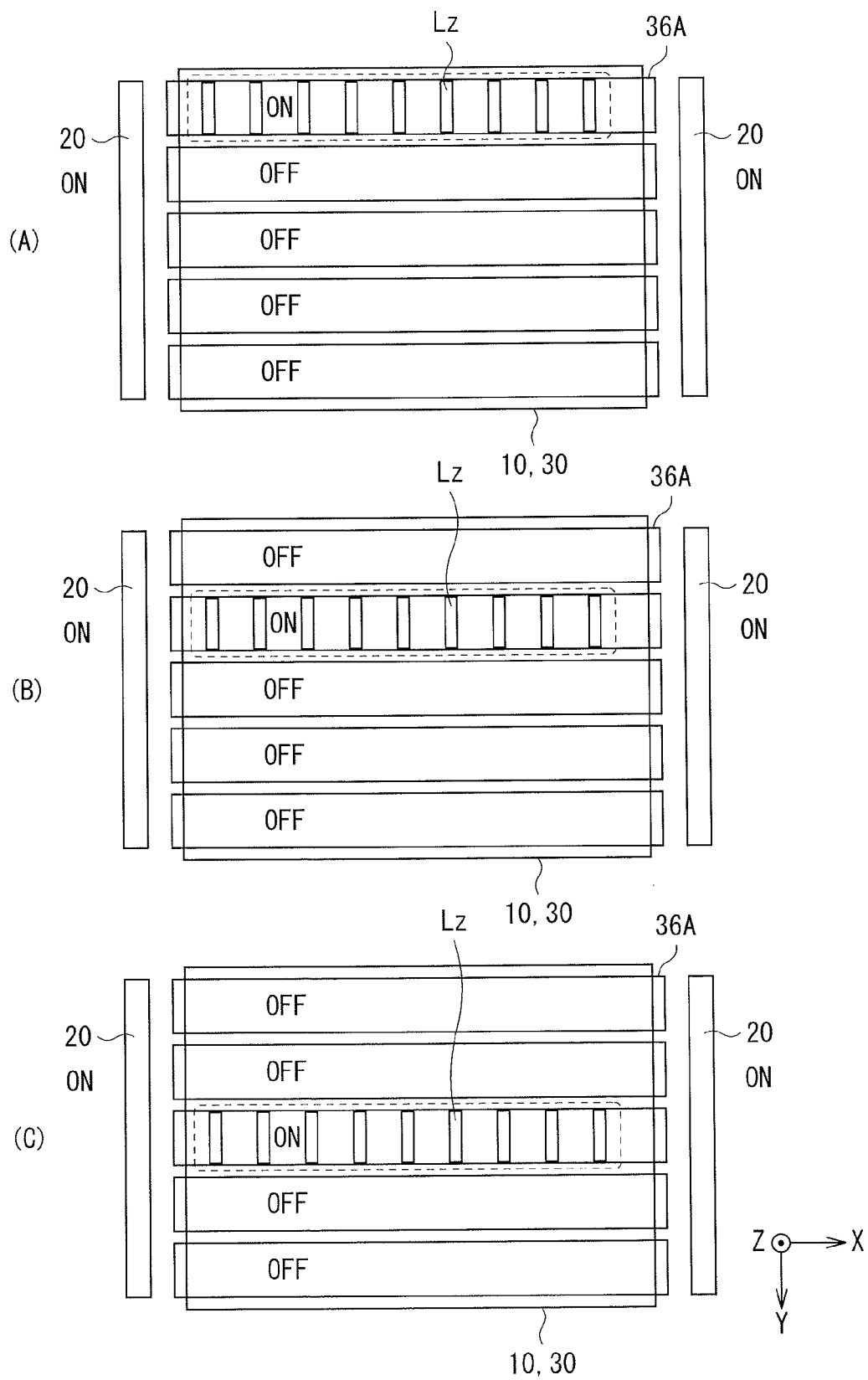
FIGS. 17A through 17C show a plan view illustrating an example of the scanning of the illumination light beams of the backlight in FIG. 16.
Figure 18:
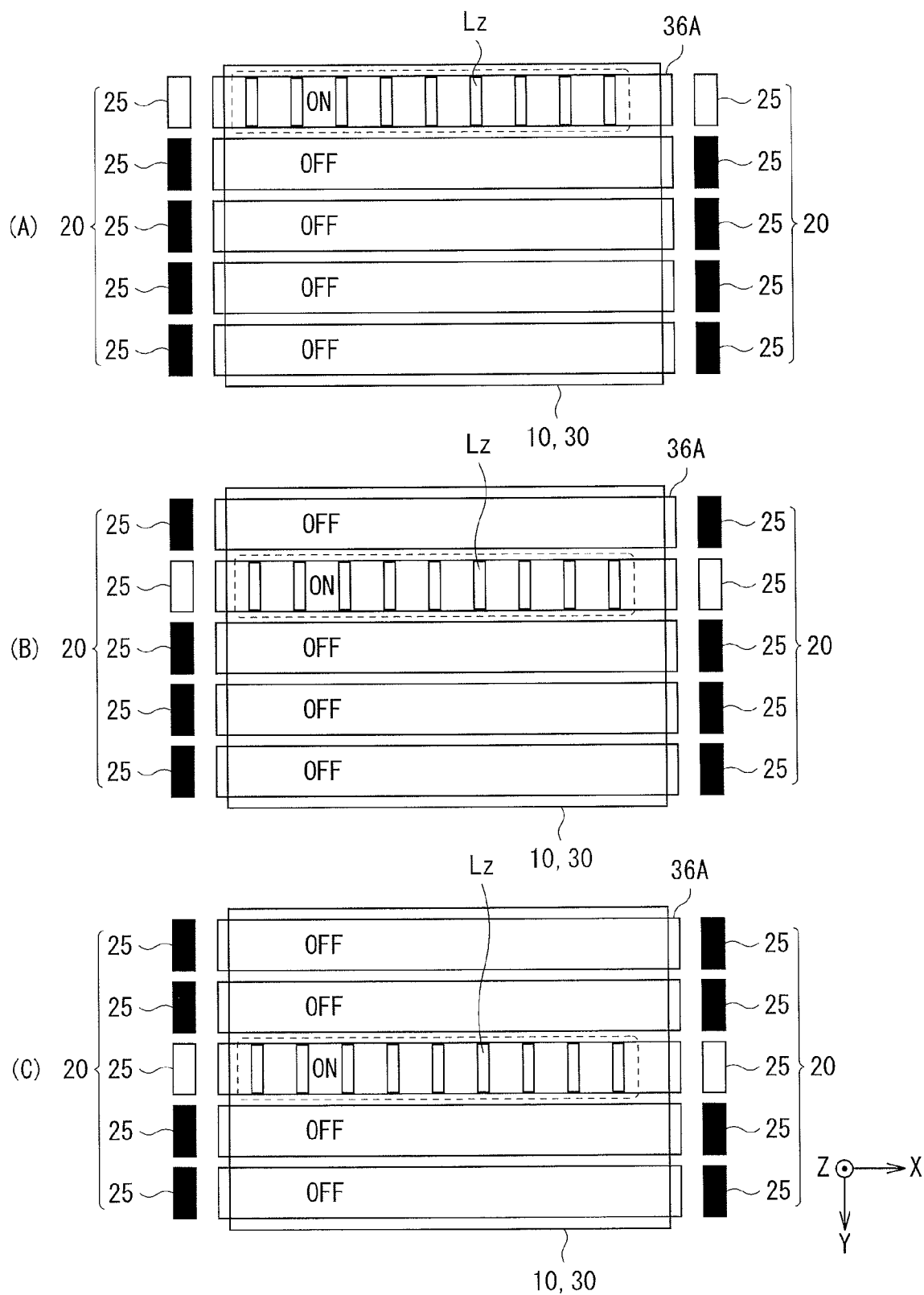
FIGS. 18A through 18C show a plan view illustrating another example of the scanning of the illumination light beams of the backlight in FIG. 16.

(A) to (C) of FIG. 17 schematically illustrate an example of the scanning of the linear illumination light beams Lz (illumination light beams) of the backlight 211 in three-dimensional display. (A) to (C) of FIG. 18 schematically illustrate another example of the scanning of the linear illumination light beams Lz (illumination light beams) of the backlight 211 in three-dimensional display. As illustrated in (A) to (C) of FIG. 17, the drive circuit 50 applies a drive voltage (a voltage generating an electric field in the light modulation layer 34) to the partial electrode 36A corresponding to the pixel row that is selected by the selection signal, in a state of turning on the entire light source 20. At this time, the drive circuit 50 applies a common fixed voltage (for example, a ground potential) to the partial electrodes 36A corresponding to pixel rows that are not selected by the selection signal, and the partial electrodes 32B, as well as puts the partial electrodes 32C into a floating state.

Incidentally, in (A) to (C) of FIG. 17, "ON" indicates that the drive voltage is applied to the partial electrode 36A, and "OFF" indicates that a common fixed voltage is applied to the partial electrode 36A. In addition, in (A) to (C) of FIG. 17, the light source 20 may be configured of a single linear light source, or may be configured of the plurality of light source blocks 25.

Moreover, when the light source 20 is configured of the plurality of light source blocks 25, for example, as illustrated in (A) to (C) of FIG. 18, the drive circuit 50 turns of the light source block 25 corresponding to the pixel row that is selected by the selection signal, and applies the drive voltage (the voltage generating an electric field in the light modulation layer 34) to the partial electrode 36A corresponding to the pixel row that is selected by the selection signal. At this time, the drive circuit 50 applies a common fixed voltage (for example, the ground voltage) to the partial electrodes 36A corresponding to pixel rows that are not selected by the selection signal, and the partial electrodes 32B, as well as puts the partial electrodes 32C into a floating state. In such a case, it is possible to suppress the consumed power low by an amount of non-lighting parts of the light source 20.

Figure 19:
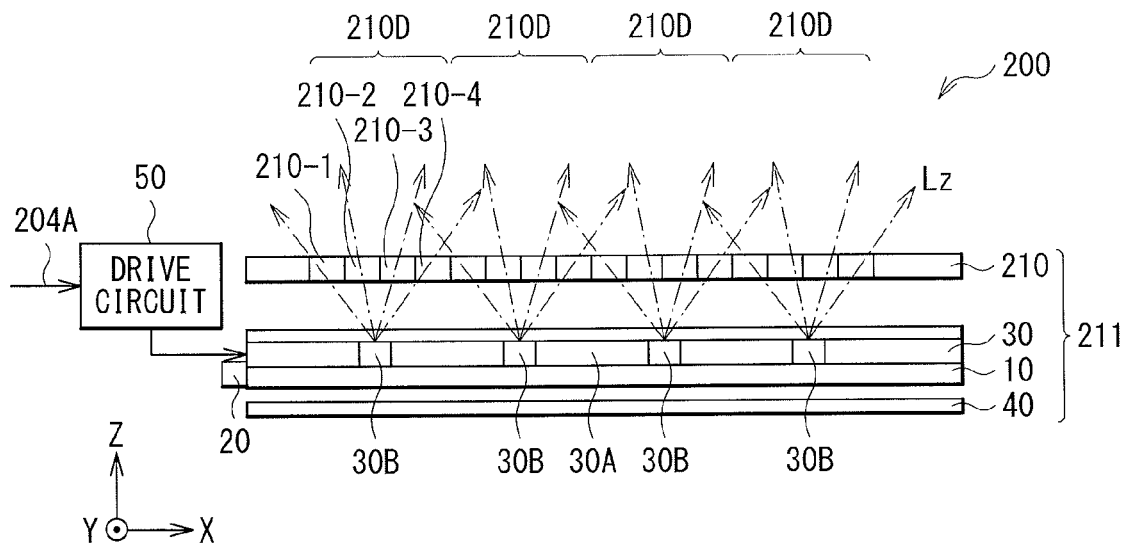
FIG. 19 is a schematic diagram of a three-dimensional display state as viewed from a cross-sectional surface of the receiver.

FIG. 19 illustrates an example of a cross-sectional structure of a part where the plurality of linear illumination light beams Lz (illumination light beams) is emitted in (A) to (C) of FIG. 17 and (A) to (C) of FIG. 18. In three-dimensional display, for example, the panel drive circuit 209 drives four pixels 210-1 to 210-4 of the display panel 210 as one three-dimensional pixel 210D. At this time, for example, the drive circuit 50 may form one scattering region 30B in each three dimensional pixel 210D, and may allow the linear illumination light beams Lz to enter the respective pixels 210-1 to 210-4 at different incident angles. Accordingly, each of the linear illumination light beams Lz enters, at the substantially the same angle, the pixel located in a position common to the respective three-dimensional pixels 210D (for example, in FIGS. 19, 210-1, 210-2, 210-3, and 210-4). As a result, from the pixel located in a position common to the respective three-dimensional pixels 210D, picture light modulated by the pixel is emitted at the predetermined angle. At this time, for example, a viewer may view picture light from the pixel 210-3 with his right eye, and at the same time, the viewer may view picture light from the pixel 210-2 with his left eye. In other words, the viewer views pictures with different parallaxes by his right and left eyes. As a result, the viewer perceives display of a three-dimensional picture (a stereoscopic picture) on the display panel 210.

When receiving a signal specifying two-dimensional display as the control signal 204A, the drive circuit 50 allows the backlight 211 to output a planar illumination light beam. More specifically, the drive circuit 50 applies a potential difference allowing the light modulation layer 34 to exhibit scattering property, to each of the light modulation cells 30a and 30b. In other words, the drive circuit 50 controls the magnitude of the potential difference applied to the pair of electrodes (the partial electrode 32A and the partial electrode 36A) in each of the light modulation cells 30a and 30b so that the optical axis AX2 of the microparticle 34B intersects or is orthogonal to (or substantially orthogonal to) the optical axis AX1 of the bulk 34A in each of the light modulation cells 30a and 30b included in the backlight 211. For example, the drive circuit 50 applies the voltage generating an electric field in the light modulation layer 34 included in each of the light modulation cells 30a and 30b, as well as applies a common fixed voltage (for example, the ground voltage) to the partial electrodes 32A.

Note that, when receiving a signal specifying two-dimensional display as the control signal 204A as well as receiving a signal relating to picture data, the drive circuit 50 may allow the backlight 211 to emit a planar illumination light beam (for example, a planar illumination light beam partially dark in plane) having luminance distribution corresponding to the picture data. Incidentally, in this case, the upper electrode 36 may be preferably arranged in a layout corresponding to the pixels of the display panel 210. When the upper electrode 36 is arranged in the layout corresponding to the pixels of the display panel 210, the drive circuit 50 applies, according to the picture data, a potential difference allowing the light modulation layer to exhibit scattering property, to some of the light modulation cells 30a and 30b, and a potential difference allowing the light modulation layer 34 to exhibit transparency, to the other of the light modulation cells 30a and 30b.

Next, functions and effects of the backlight 211 of the present embodiment will be described.

In the backlight 211 of the present embodiment, in three dimensional display, the voltage is applied to the pair of electrodes (the partial electrode 32A and the partial electrode 36A) in each of the light modulation cells 30a and 30b so that the optical axis AX2 of the microparticle 34B intersects or is orthogonal to (or substantially orthogonal to) the optical axis AX1 of the bulk 34A in each of the light modulation cells 30a and the optical axis AX2 of the microparticle 34B is parallel to or substantially parallel to the optical axis AX1 of the bulk 34A in each of the light modulation cells 30b. Accordingly, in the light modulation device 30, each of the light modulation cells 30a becomes the scattering region 30B, and each of the light modulation cells 30a becomes the transmissive region 30A. As a result, the light that has been emitted from the light source 20 and has entered the light guide plate 10 passes through the transmissive region 30A of the light modulation device 30, and is scattered in the scattering region 30B of the light modulation device 30 (FIG. 19). Light that has passed through the bottom surface of the scattering region 30B of the scattered light is reflected by the reflector 40 to return to the light guide plate 10 again, and then is emitted from the top surface of the backlight 211. In addition, light traveling toward the top surface of the scattering region 30B of the scattered light passes through the light guide plate 10, and then is emitted from the top surface of the backlight 211. As described above, in three-dimensional display, light is scarcely emitted from the top surface of the transmissive region 30A and light is emitted from the top surface of the scattering region 30B. In this way, for example, as illustrated in FIG. 19, the plurality of linear illumination light beams Lx may be emitted in the front direction.

As a result, each of the linear illumination light beams emitted in the front direction enters the back surface of the display panel 210. Therefore, for example, when two-dimensional picture data for three-dimensional display is generated by the picture signal processing circuit 207 so that each pixel row becomes three-dimensional pixel 210A in the pixel arrangement corresponding to each of the linear illumination light beams, each of the linear illumination light beams enters, at the substantially same angle, the pixel located in a position common to the respective three-dimensional pixels 210A (for example, in FIG. 19, pixels 210-1, 210-2, 210-3, and 210-4). As a result, from the pixel located in a position common to the respective three-dimensional pixels 210A, picture light modulated by the pixel is emitted at the predetermined angle. At this time, a viewer views pictures with different parallaxes by his right and left eyes. Thus, the viewer perceives display of a three-dimensional picture (a stereoscopic picture) on the display panel 210.

Figure 20:
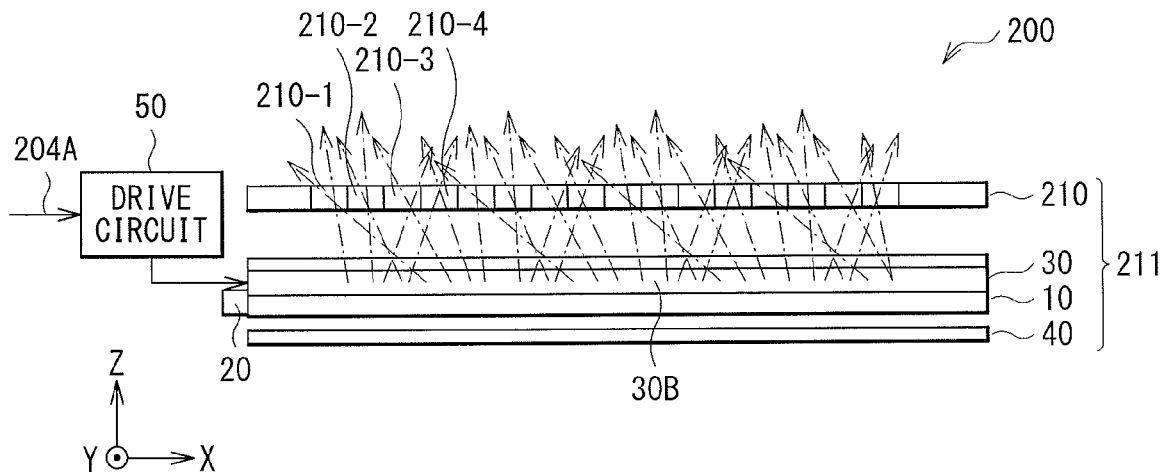
FIG. 20 is a schematic diagram of a three-dimensional display state as viewed from a cross-sectional surface of the receiver.

Moreover, in the backlight 211 of the present embodiment, the voltage is applied to the pair of electrodes (the partial electrode 32A and the partial electrode 36A) in each of the light modulation cells 30a and 30b so that the optical axis AX2 of the microparticle 34B intersects or is orthogonal to (or substantially orthogonal to) the optical axis AX1 of the bulk 34A in each of the light modulation cells 30a and 30b, in two-dimensional display. Accordingly, the light that has been emitted from the light source 20 and has entered the light guide plate 10 is scattered in the scattering region 30B that is formed in the entire light modulation device 30 (FIG. 20). Light that has passed through the bottom surface of the scattering region 30B of the scattered light is reflected by the reflector 40 to return to the light guide plate 10 again, and then is emitted from the top surface of the backlight 211. In addition, light traveling toward the top surface of the scattering region 30B of the scattered light passes through the light guide plate 10, and then is emitted from the top surface of the backlight 211. As described above, in two-dimensional display, for example, light may be emitted from the entire top surface of the light modulation device 30, and a planar illumination light beam may be emitted in the front direction.

As a result, the planar illumination light beam emitted in the front direction enters the back surface of the display panel 210. Accordingly, for example, when two-dimensional picture data for two-dimensional display corresponding to each pixel 210B is generated by the picture signal processing circuit 207, the planar illumination light beam enters each of the pixels 210B from all angles, and picture light modulated by each of the pixels 210B is emitted from each of the pixels 210B. At this time, the viewer views the same picture by both eyes, and thus the viewer perceives display of a two-dimensional picture (a planar picture) on the display panel 210.

Moreover, in the present embodiment, when the light modulation layer 34 exhibits the scattering property, the bulk 34A having low electric-field responsiveness has a component of the optical axis AX1 mainly in a direction parallel to the transmission axis AX10 of the polarization plate 210B, and the microparticle 34B having high electric-field responsiveness has the optical axis AX2 in a direction that intersects or is orthogonal to (or substantially orthogonal to) the optical axis AX1 of the bulk 34A and intersects or is orthogonal to (or substantially orthogonal to) the transparent substrate 31. Accordingly, the polarization axis of the light emitted from the backlight 211 has a main component in the direction parallel to the transmission axis AX10 of the polarization plate 21B, and thus the light of the backlight 211 is allowed to enter the liquid crystal panel 210A more efficiently as compared with the case where non-polarized light with the same luminance is emitted from the backlight 211. Therefore, even in the case where three-dimensional display is performed with use of the smaller number of pixels than that in two-dimensional display, three-dimensional display with high display luminance is allowed to be performed. In addition, two-dimensional display with high display luminance is also allowed to be performed.

Incidentally, in the present embodiment, when a three-dimensional picture is displayed on the display panel 210, the scanning of the display panel 210 is synchronized with the scanning of the linear illumination light beams Lz (partial illumination light beams) of the backlight 211. Accordingly, it is possible to put the region under picture rewriting into a non-display state surely. As a result, it is possible to prevent occurrence of crosstalk.

Other effects of the receiver 200 according to the present embodiment will be described below.

Typically, the PDLC is formed by mixing a liquid crystal material and an isotropic low-molecular material and causing phase separation by ultraviolet irradiation, drying of a solvent, etc., and the PDLC is a composite layer in which microparticles of the liquid crystal material are dispersed in a polymer material. The liquid crystal material in the composite layer exhibits scattering property because the liquid crystal material face in random directions during no-potential-difference application; however the liquid crystal material aligns in an electric field direction during potential-difference application. Accordingly, the liquid crystal material in the composite layer exhibits high transparency in the front direction (in the normal direction of the PDLC) when the ordinary refractive index of the liquid crystal material is equal to the refractive index of the polymer material. However, in the liquid crystal material, in the oblique direction, difference between the extraordinary refractive index of the liquid crystal material and the refractive index of the polymer material is remarkable, and this results in expression of scattering property in the oblique direction even when transparency is expressed in the front direction.

Usually, a light modulation device using the PDLC frequently has a structure in which the PDLC is sandwiched between two glass plates that each have a front surface provided with a transparent conductive film. When light obliquely enters, from the air, the light modulation device having the above-described structure, the light that has entered the light modulation device in the oblique direction is refracted due to difference in refractive index between the air and the glass plate, and enters the PDLC at a smaller angle. Therefore, in such a light modulation device, large scattering does not occur. For example, when light enters the light modulation device from the air at an angle of 80 degrees, the entering angle of the light to the PDLC may be decreased to about 40 degrees by refraction at the glass interface.

However, in an edge light system using a light guide plate, since light enters through the light guide plate, the light crosses the PDLC at a large angle of about 80 degrees. Therefore, the difference between the extraordinary refractive index of the liquid crystal material and the refractive index of the polymer material is large, and further the light crosses the PDLC at larger angle, and optical path subjected to scattering is also increased accordingly. For example, when microparticles of a liquid crystal material that has an ordinary refractive index of 1.5 and an extraordinary refractive index of 1.65 are dispersed in a polymer material having a refractive index of 1.5, difference in refractive index is not generated in the front direction (the normal direction of the PDLC); however the difference in refractive index is increased in the oblique direction. Therefore, this prevents the scattering property in the oblique direction from being decreased so that viewing angle characteristics are deteriorated. Further, when an optical film such as a diffuser film is provided on the light guide plate, obliquely-leaked light is diffused also in the front direction by the diffuser film or the like. Therefore, light leakage in the front direction is increased and the modulation ratio in the front direction is lowered.

On the other hand, in the present embodiment, since the bulk 34A and the microparticle 34B are formed to mainly contain respective optical anisotropic materials, the scattering property is decreased and the transparency is improved in the oblique direction. For example, when the bulk 34A and the microparticle 34B are configured to mainly contain respective optical anisotropic materials whose ordinary refractive indices are equal to each other and whose extraordinary refractive indices are also equal to each other, and in a region where a potential difference is not applied between the lower electrode 32 and the upper electrode 36, the directions of the optical axes thereof coincide or substantially coincide with each other. Therefore, difference in refractive index is decreased or eliminated in all directions including the front direction (the normal direction of the light modulation device 30) and the oblique direction, and higher transparency is obtainable. As a result, light leakage in a region where a viewing angle is large is allowed to be decreased or substantially eliminated, and viewing angle characteristics are allowed to be improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed through polymerization of the liquid crystalline monomer. As a result, since the refractive indices are coincident with each other in all directions, in such a case, a state with higher transparency is achievable and the viewing angle characteristics are further improved.

In addition, in the present embodiment, for example, as illustrated in (A) and (B) of FIG. 13, the luminance of the transmissive region 30A (the luminance of black display) is lower than that in the case where light is uniformly emitted from the entire surface (alternate long and short dash line in (B) of FIG. 13). On the other hand, the luminance of the scattering region 30B is extremely higher than that in the case where light is uniformly emitted from the entire surface (alternate long and short dash line in (B) of FIG. 13), and the luminance of partial white display (luminance enhancement) is increased by a decreased amount of the luminance of the transmissive region 30A.

Incidentally, the luminance enhancement is a technique to enhance luminance when partial white display is performed, as compared with the case of entire white display. This is a technique generally used for CRT, PDP, and the like. In a liquid crystal display, however, a backlight uniformly emits light as a whole irrespective of an image so that partial enhancement of luminance is difficult. Incidentally, when the backlight is configured as an LED backlight in which a plurality of LEDs are two-dimensionally arranged, the LEDs are allowed to be partially turned off. In such a case, however, diffusion light from a dark region where the LEDs are turned off is absent, and thus the luminance is lowered as compared with the case where all of the LEDs are turned on. In addition, although it is possible to increase the luminance by increasing a current flowing through the LEDs partially turned on, in such a case, large current flows through the LEDs in an extremely short time, and thus issues are remained in terms of load and reliability of circuits.

On the other hand, in the present embodiment, since the bulk 34A and the microparticle 34B are formed to mainly contain respective optical anisotropic materials, the scattering property in the oblique direction is suppressed and leakage of light from the light guide plate in a dark state is suppressed. Therefore, the light is guided from a partial dark region to a partial bright region so that luminance enhancement is achievable without increasing power supplied to the backlight 211.

Moreover, in the present embodiment, in a region where a potential difference is not applied between the lower electrode 32 and the upper electrode 36, the optical axis AX2 of the microparticle 34B is parallel to the light incident surface 10A of the light guide plate 10, and intersects the surfaces of the transparent substrates 31 and 37 at the slight angle θ1. Specifically, the liquid crystal molecule contained in the microparticle 34B is aligned in a state of being inclined at the angle θ1 in a plane parallel to the light incident surface 10A (in a state of being provided with a pretilt angle). Therefore, during potential-difference application, the liquid crystal material contained in the microparticle 34B does not stand up in random directions, and stands up in the plane parallel to the light incident surface 10A. At this time, the optical axis AX1 of the bulk 34A intersects or is orthogonal to (or substantially orthogonal to) the optical axis AX2 of the microparticle 34B in the plane parallel to the light incident surface 10A. In this case, of the light entering the light guide plate 10 from the light incident surface 10A, light oscillating perpendicular to the transparent substrate 31 is affected by a difference between the extraordinary refractive index of the microparticle 34B and the ordinary refractive index of the bulk 34A. At this time, since the difference between the extraordinary refractive index of the microparticle 34B and the ordinary refractive index of the bulk 34A is large, the scattering efficiency of the light oscillating perpendicular to the transparent substrate 31 is increased. On the other hand, the light oscillating parallel to the transparent substrate 31 is affected by the difference between the ordinary refractive index of the microparticle 34B and the extraordinary refractive index of the bulk 34A. At this time, since the difference between the ordinary refractive index of the microparticle 34B and the extraordinary refractive index of the bulk 34A is also large, the scattering efficiency of the light oscillating parallel to the transparent substrate 31 is also increased. Accordingly, light propagating through the region where a potential difference is applied between the lower electrode 32 and the upper electrode 36 contains a large amount of oblique component. For example, when an acryl light guide plate is used as the light guide plate 10, the light in the region where a potential difference is applied between the lower electrode 32 and the upper electrode 36 propagates the region at an angle of 41.8 degrees or more. As a result, the refractive index difference is increased in all directions including the oblique direction, and high scattering property is obtained, and thus display luminance is allowed to be improved. In addition, it is possible to further improve the display luminance due to the effect of the above-described luminance enhancement.

Incidentally, for example, when the optical axis AX1 of the bulk 34A and the optical axis AX2 of the microparticle 34B are arranged perpendicular to the light incident surface 10A of the light guide plate 10 during no-potential-difference application, and the liquid crystal material contained in the microparticle 34B is adapted to stand up in a plane perpendicular to the light incident surface 10A during potential-difference application, as with the case described above, the light oscillating perpendicular to the transparent substrate 31 is affected by the difference between the extraordinary refractive index of the microparticle 34B and the ordinary refractive index of the bulk 34A. However, the light oscillating parallel to the transparent substrate 31 is affected by the difference between the ordinary refractive index of the microparticle 34B and the ordinary refractive index of the bulk 34A. In this case, the difference between the ordinary refractive index of the microparticle 34B and the ordinary refractive index of the bulk 34A is zero or substantially zero. Therefore, of the light entering the light guide plate 10 from the light incident surface 10A, the light oscillating perpendicular to the transparent substrate 31 is largely affected by the refractive index difference as with the case described above, whereas the light oscillating parallel to the transparent substrate 31 is free or substantially free from influence of the refractive index difference. As a result, the scattering efficiency of the light oscillating perpendicular to the transparent substrate 31 is increased, but the scattering efficiency of the light oscillating parallel to the transparent substrate 31 is low or zero. Therefore, when the optical axes AX1 and AX2 are arranged perpendicular to the light incident surface 10A, the scattering efficiency is lower than that in the case where the optical axes AX1 and AX2 are arranged parallel to the light incident surface 10A. As a result, the luminance extracted from the light guide plate 10 is lower than that of the light modulation device 30 of the present embodiment.

As described above, in the present embodiment, the display luminance is allowed to be improved while light leakage in a region where the viewing angle is large is decreased or substantially eliminated. As a result, modulation ratio in the front direction is allowed to be high.

<2. Modifications>
(First Modification)

Figure 21:
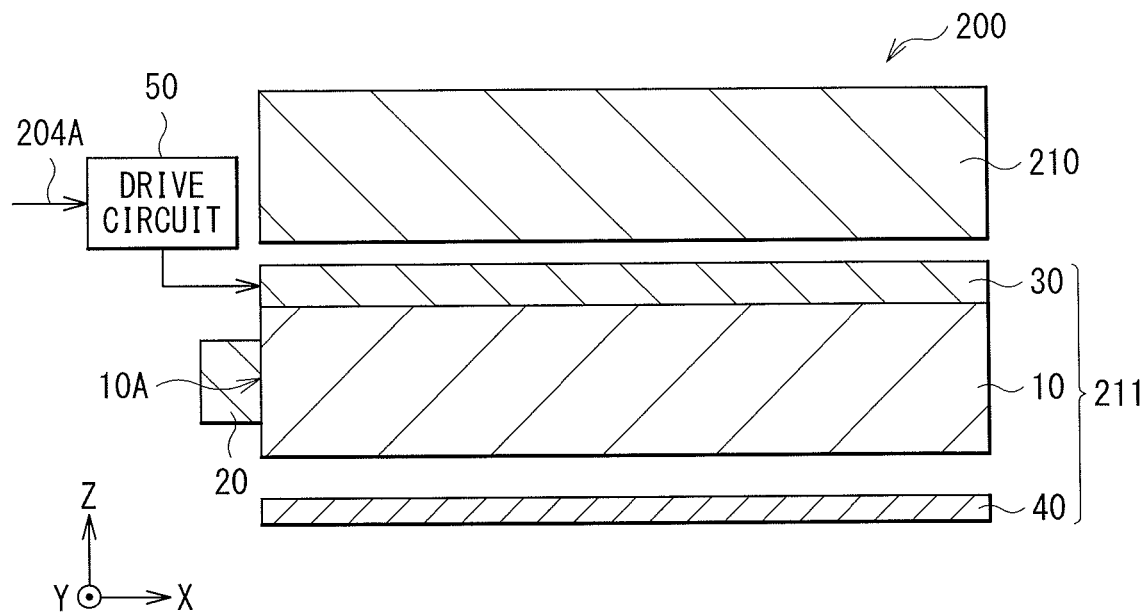
FIG. 21 is a sectional diagram illustrating a modification of the structure of the display section in FIG. 3.
Figure 22:
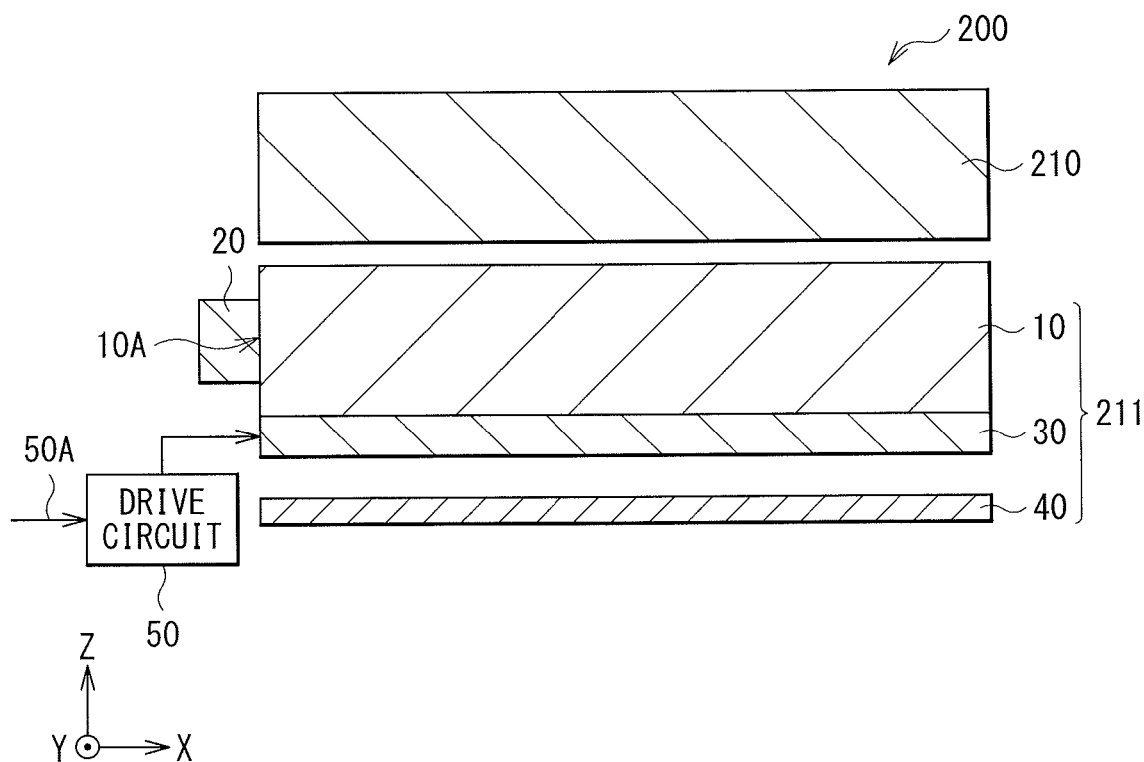
FIG. 22 is a sectional diagram illustrating another modification of the structure of the display section in FIG. 3.

In the above-described embodiment, the light modulation device 30 is provided inside the light guide plate 10. However, for example, as illustrated in FIG. 21, the light modulation device 30 may be closely bonded to the top surface of the light guide plate 10 without an air layer in between. Moreover, for example, as illustrated in FIG. 22, the light modulation device 30 may be closely bonded to a backside (a bottom surface) of the light guide plate 10 without an air layer in between.

(Second Modification)

Figure 23:
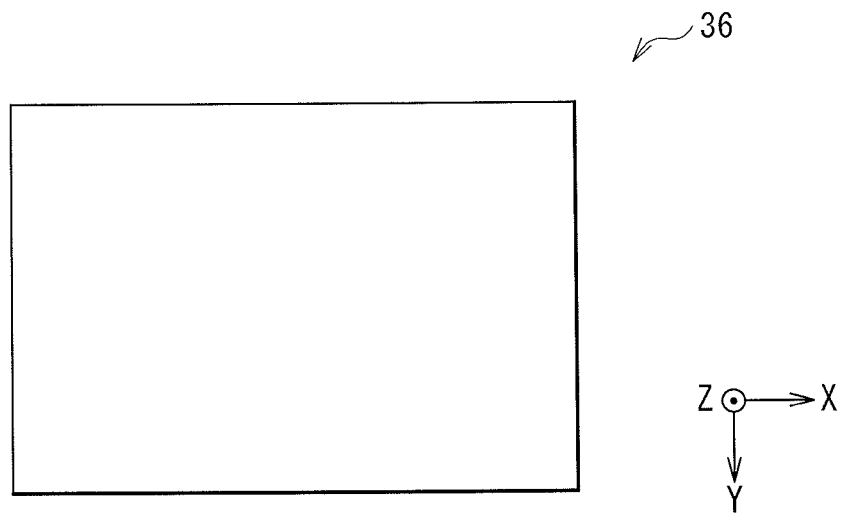
FIG. 23 is a plan view illustrating a modification of the structure of the lower electrode in FIG. 6.

In the above-described embodiment and the modification thereof, the upper electrode 36 is configured of the plurality of partial electrodes 36A. However, for example, as illustrated in FIG. 23, the upper electrode 36 may be a solid film (a planar electrode) formed over the entire surface. In this case, when the light source 20 is configured of the plurality of light source blocks 25, the light guide plate 10 may preferably enhance directivity of the light from the light source blocks 25. For example, as illustrated in (A) and (B) of FIG. 24, the light guide plate 10 may preferably have a plurality of strip-shaped projections 11 on the upper surface or the bottom surface thereof. In addition, although not illustrated, for example, the light guide plate 10 may have the plurality of strip-shaped projections 11 in the light guide plate 10. Moreover, the inside of the light guide plate 10 may be hollow or may be densely packed.

Figure 24:
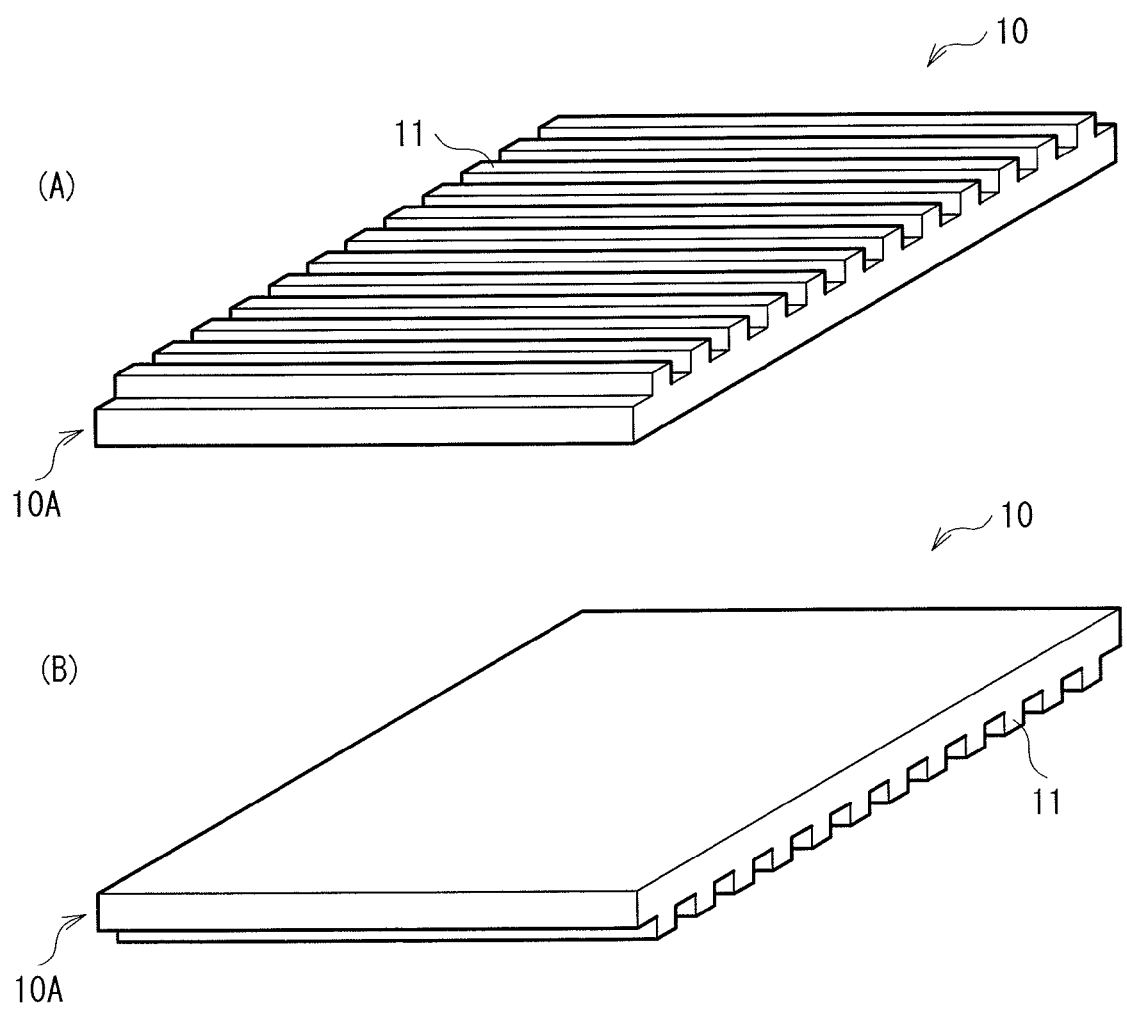
FIGS. 24A and 24B show a perspective view illustrating another example of a structure of a light guide plate in FIG. 3.

The projections 11 each extend in the direction parallel to the normal of the light incidence surface 10A, and for example, as illustrated in (A) and (B) of FIG. 24, the projections 11 may be formed successively from one side surface of the light guide plate 10 to the other side surface facing that side surface. A cross-sectional surface in an arrangement direction of each of the projections 11 may have, for example, a rectangular shape, a trapezoidal shape, or a triangular shape. When the cross-sectional surface in the arrangement direction of each of the projections 11 has a rectangular shape, a rectilinear propagation property of light is extremely high, and the light guide plate 10 having such projections 11 is suitable for a large-scale backlight. When the cross-sectional surface in the arrangement direction of each of the projections 11 has a trapezoidal shape, processing of a die used to form each of the projections 11 by injection molding, extrusion molding, heat-press molding, or the like is easy, and mold releasability in molding is high, and yields and molding speed are allowed to be improved due to a reduction in errors.

Figure 25:
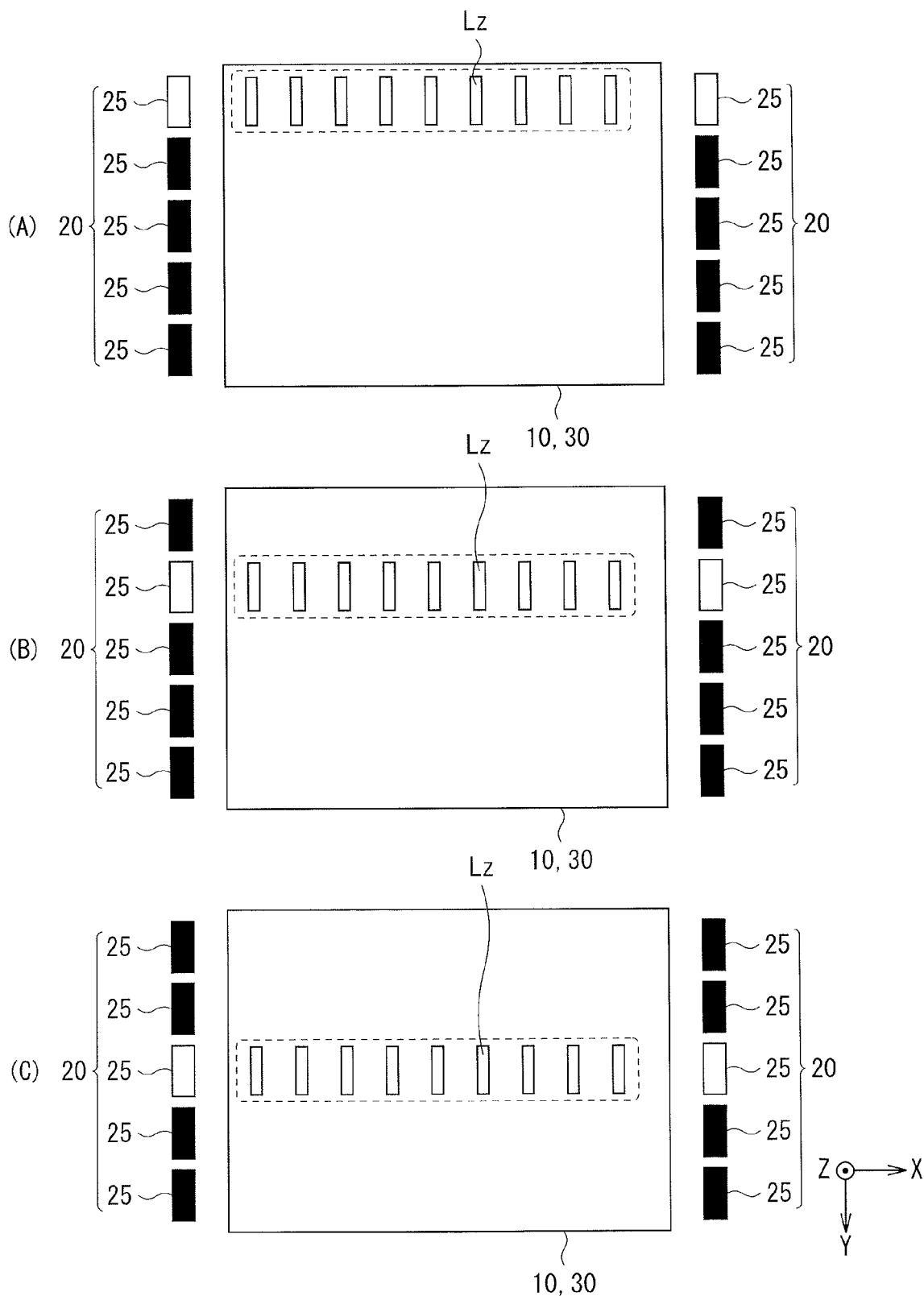
FIGS. 25A through 25C show a plan view illustrating an example of scanning of illumination light beams of a backlight when the light guide plate in FIG. 24 is used.

(A) to (C) of FIG. 25 schematically illustrate an example of the scanning of the linear illumination light beams Lz (the illumination light beams) of the backlight 211 in three-dimensional display. In this example, it is assumed that the light source 20 is configured of the plurality of light source blocks 25. For example, the drive circuit 50 may turn on only the light source block 25 corresponding to the pixel row that is selected by the selection signal, and apply the drive voltage (the voltage generating an electric field in the light modulation layer 34) to each of the partial electrodes 32B. At this time, the drive circuit 50 applies a common fixed voltage (for example, the ground voltage) to the partial electrodes 32C and the upper electrodes 36.

As described above, in the present modification, when a three-dimensional picture is displayed on the display panel 210, the light source block 25 is selectively driven, instead of selectively driving the partial electrode 36A, to perform the scanning of the linear illumination light beams Lz (the partial illumination light beams) in synchronization with the scanning of the display panel 210. Therefore, it is possible to put a region under picture rewriting into a non-display state surely. As a result, it is possible to prevent occurrence of crosstalk.

(Third Modification)

In the above-described embodiment and the modifications thereof, when one piece of two-dimensional picture data is created with use of the plurality of pieces of two-dimensional picture data with different perspectives that are contained in the picture data for three-dimensional display input from the decoder 206, the picture signal processing circuit 207 may create two-dimensional picture data corresponding to the three-dimensional pixel 210D at a normal position (hereinafter, referred to as "two-dimensional picture data in A line") and two-dimensional picture data corresponding to the three-dimensional pixel 210D at a position that is shifted from the three-dimensional pixel 210D at the normal position by a half pitch in the row direction (hereinafter, referred to as "two-dimensional picture data in B line"). In this case, for example, as illustrated in (A) of FIG. 26, the panel drive circuit 209 alternately outputs, in every 1F, a picture signal corresponding to the two-dimensional picture data in the A line and a picture signal corresponding to the two-dimensional picture data in the B line to the respective data lines.

Figure 26:
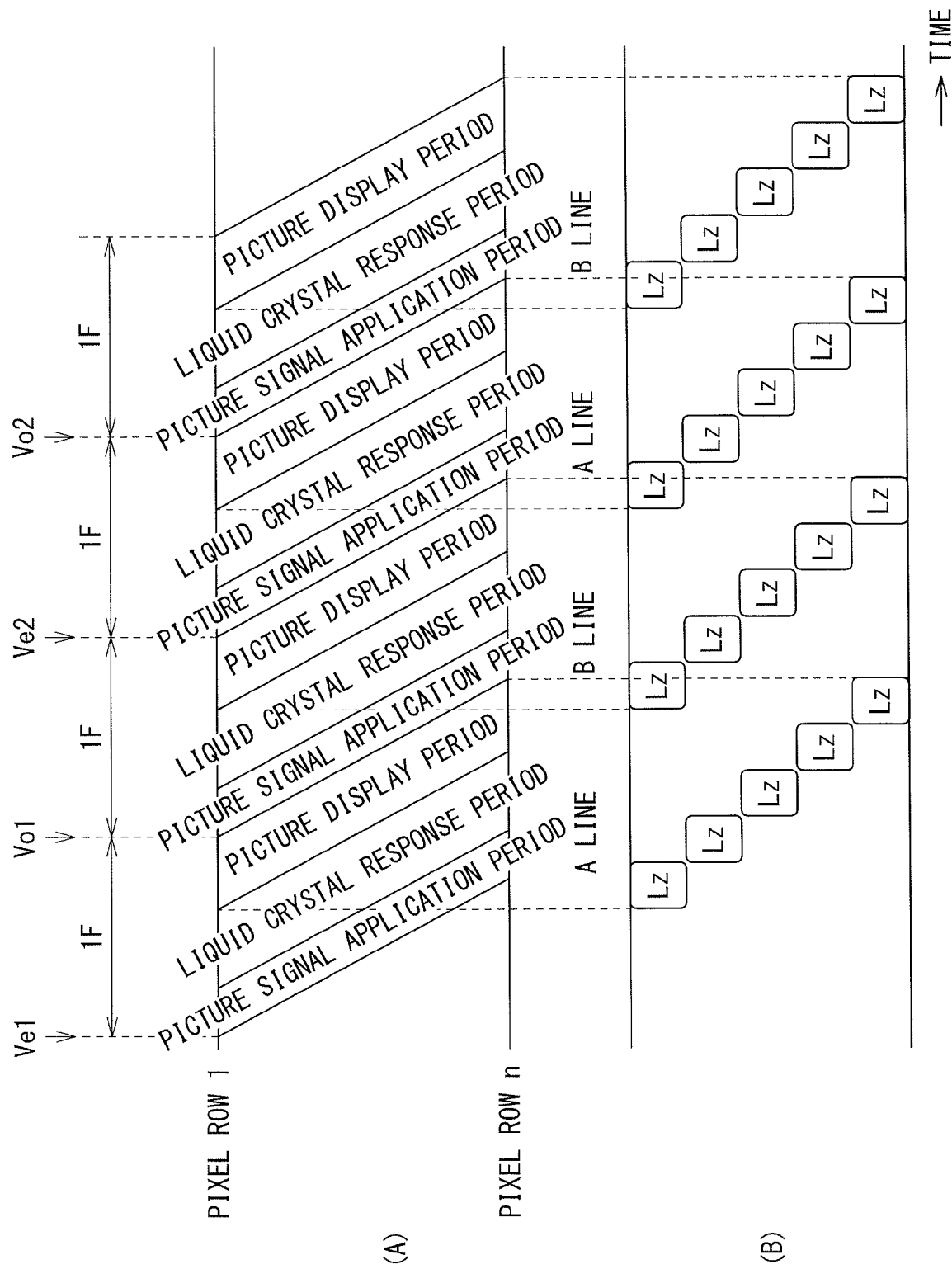
FIGS. 26A and 26B show a diagram illustrating another example of the scanning in FIG. 16.

Further, in this case, as illustrated in (B) of FIG. 26, the drive circuit 50 outputs, in every 1F, the linear illumination light beams Lz (the partial illumination light beams) alternately to the three-dimensional pixel 210D at the normal position and to the three-dimensional pixel 210D at the position that is shifted from the three-dimensional pixel 210D at the normal position by the half pitch in the row direction. Therefore, the drive circuit 50 generates an image with double resolution, as compared with the case where an image of one frame is generated in 1F.

To achieve such driving by the drive circuit 50, for example, it is necessary for the drive circuit 50 to perform the following. For example, first, the drive circuit 50 may perform scanning in a state where the scattering region 30B (the linear illumination light beam Lz) at the position corresponding to the three-dimensional pixel 210D at the normal position during first 1F, and then performs scanning in a state where the scattering region 30B (the linear illumination light beam Lz) at the position corresponding to the three-dimensional pixel 210D at the position that is shifted from the three-dimensional pixel 210D at the normal position by the half pitch in the row direction during next 1F.

Figure 27:
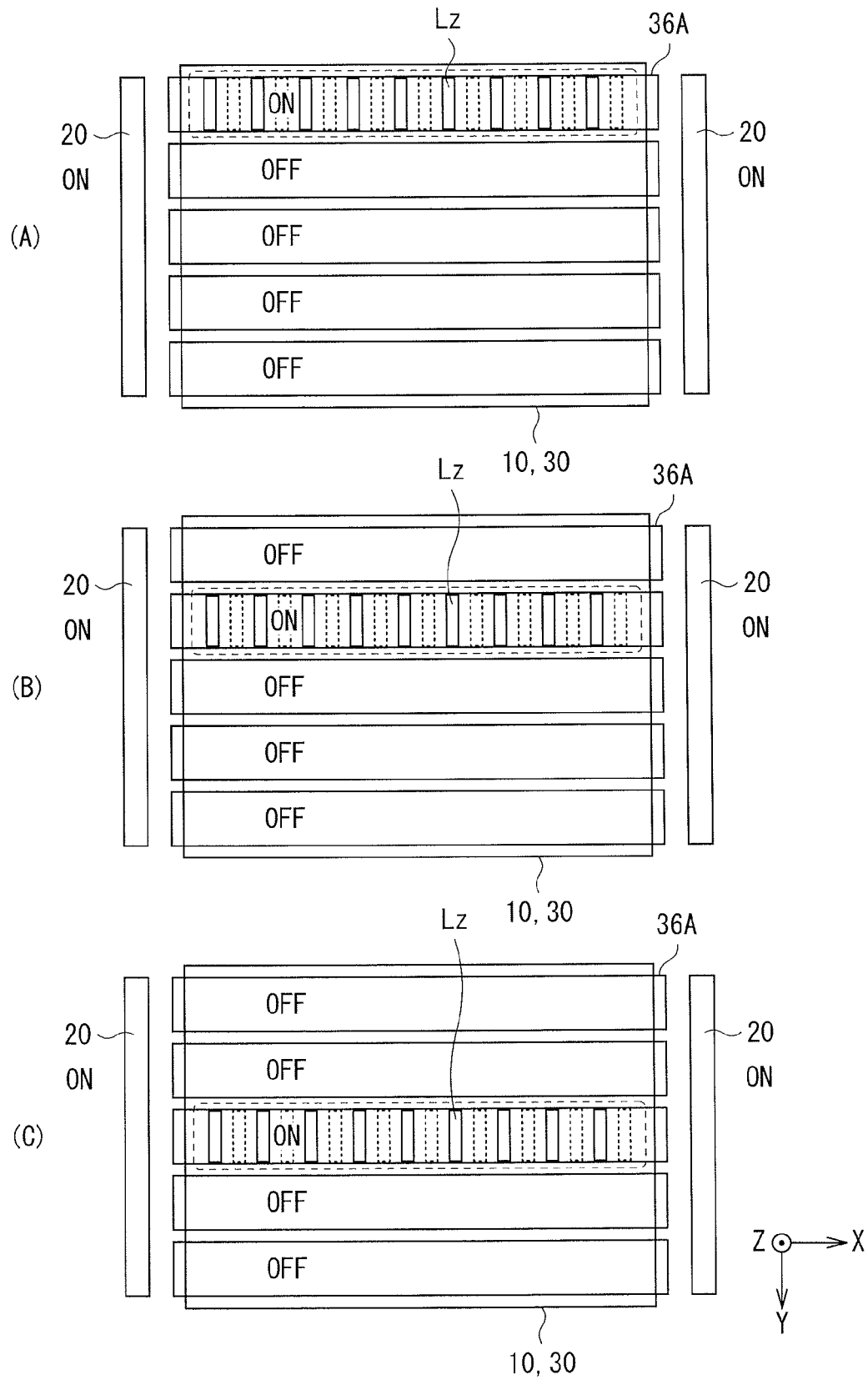
FIGS. 27A through 27C show a plan view illustrating an example of scanning of linear illumination light beams in three-dimensional display.
Figure 28:
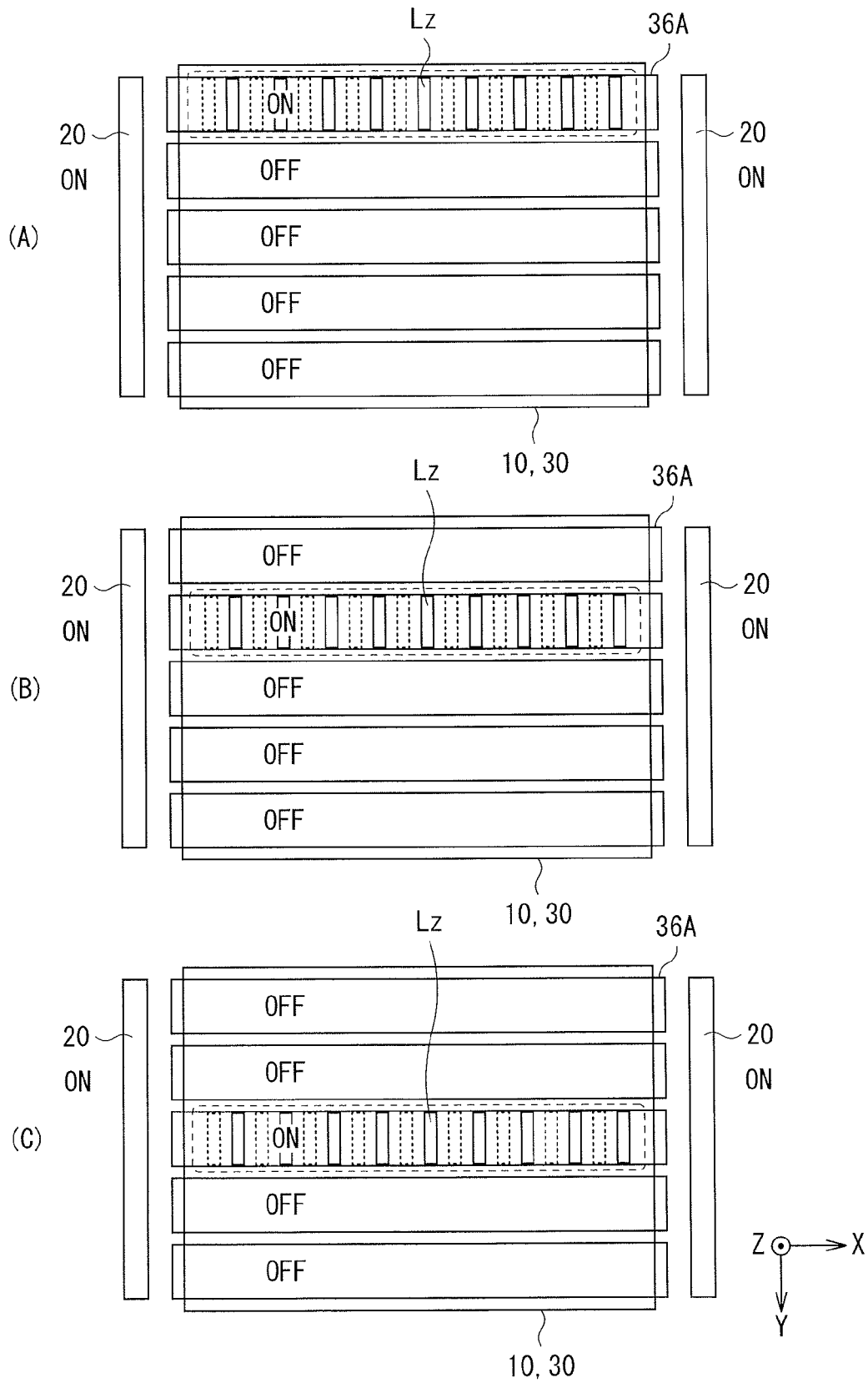
FIGS. 28A through 28C show a plan view illustrating an example of the scanning following FIG. 28.

(A) to (C) of FIG. 27 and (A) to (C) of FIG. 28 schematically illustrate an example of the scanning of the linear illumination light beams Lz (the illumination light beams) of the backlight 211 in three-dimensional display. The drive circuit 50 applies the drive voltage (the voltage generating an electric field in the light modulation layer 34) to the partial electrode 36A corresponding to the pixel row that is selected by the selection signal, in a state where the entire light source 20 is turned on. At this time, during first 1F, the drive circuit 50 applies a common fixed voltage (for example, the ground potential) to the partial electrodes 36A corresponding to the pixel rows that are not selected by the selection signal, and the partial electrodes 32B, as well as puts the partial electrodes 32C into a floating state. Further, during next 1F, the drive circuit 50 applies a common fixed voltage (for example, the ground potential) to the partial electrodes 36A corresponding to pixel rows that are not selected by the selection signal, and the partial electrodes 32C, as well as puts the partial electrodes 32B into a floating state.

Incidentally, in (A) to (C) of FIG. 27 and (A) to (C) of FIG. 28, "ON" indicates that the drive voltage is applied to the partial electrode 36A, and "OFF" indicates that a common fixed voltage is applied to the partial electrode 36A. In addition, in (A) to (C) of FIG. 27 and (A) to (C) of FIG. 28, the light source 20 may be configured of a single linear light source, or may be configured of the plurality of light source blocks 25.

Figure 29:
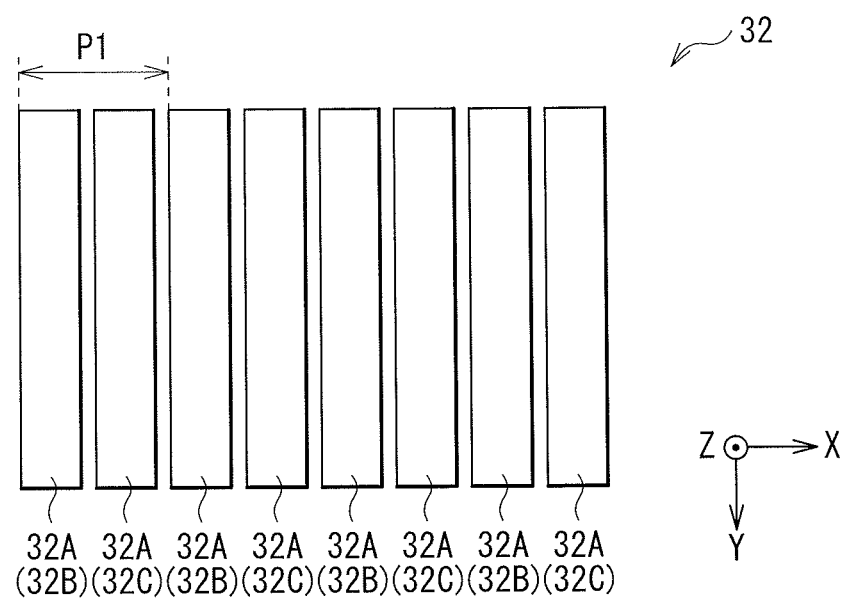
FIG. 29 is a plan view illustrating another modification of the structure of the lower electrode in FIG. 6.

Moreover, to achieve the above-described driving by the drive circuit 50, for example, as illustrated in FIG. 29, the partial electrodes 32B and the partial electrodes 32C may be preferably arranged alternately in the arrangement direction. Note that, when driving described below by the drive circuit 50 is achieved, for example, as illustrated in FIG. 29, the partial electrodes 32B and the partial electrodes 32C may be preferably arranged alternately in the arrangement direction.

Figure 30:
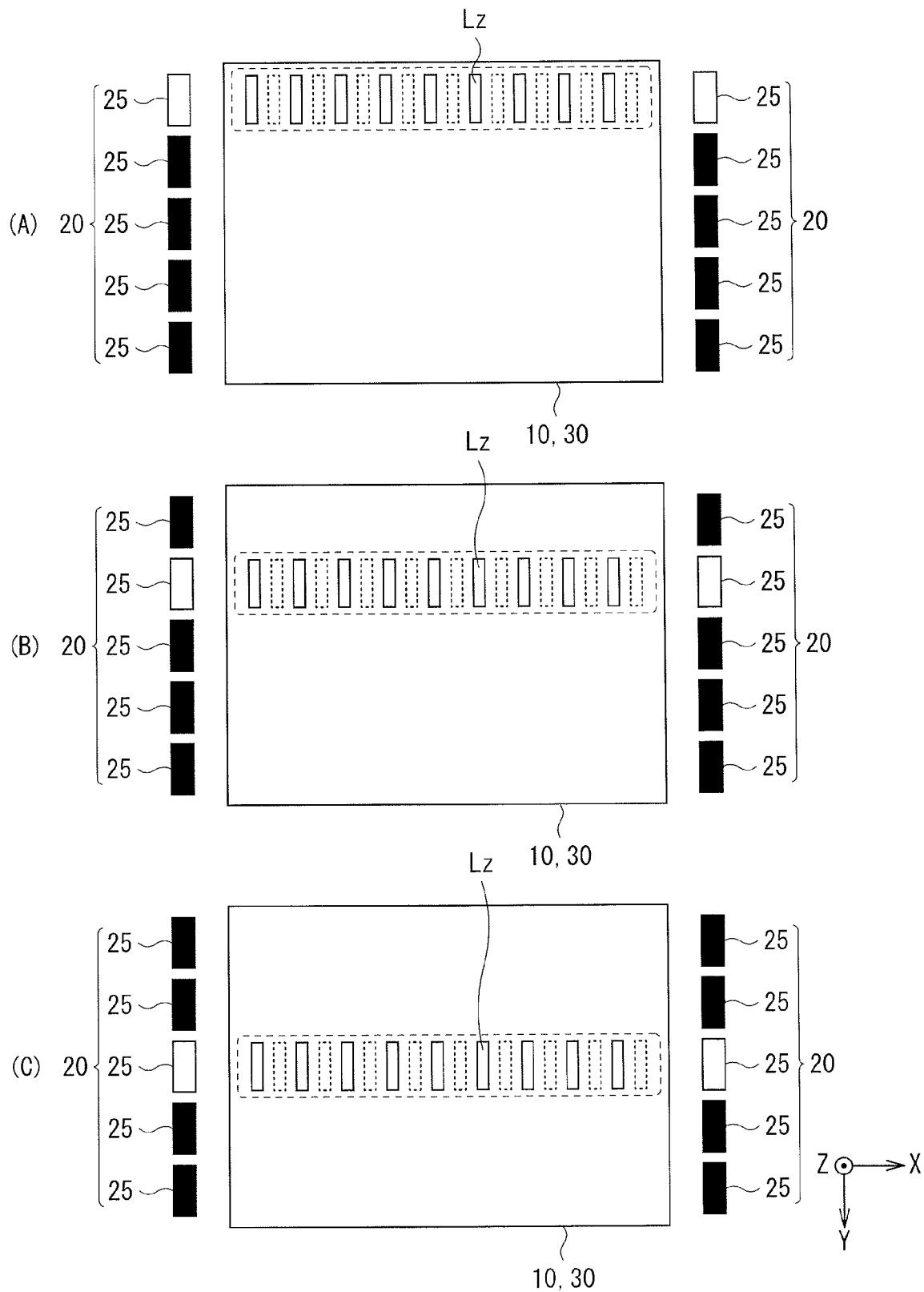
FIGS. 30A through 30C show a plan view illustrating another example of the scanning of the linear illumination light beams in three-dimensional display.
Figure 31:
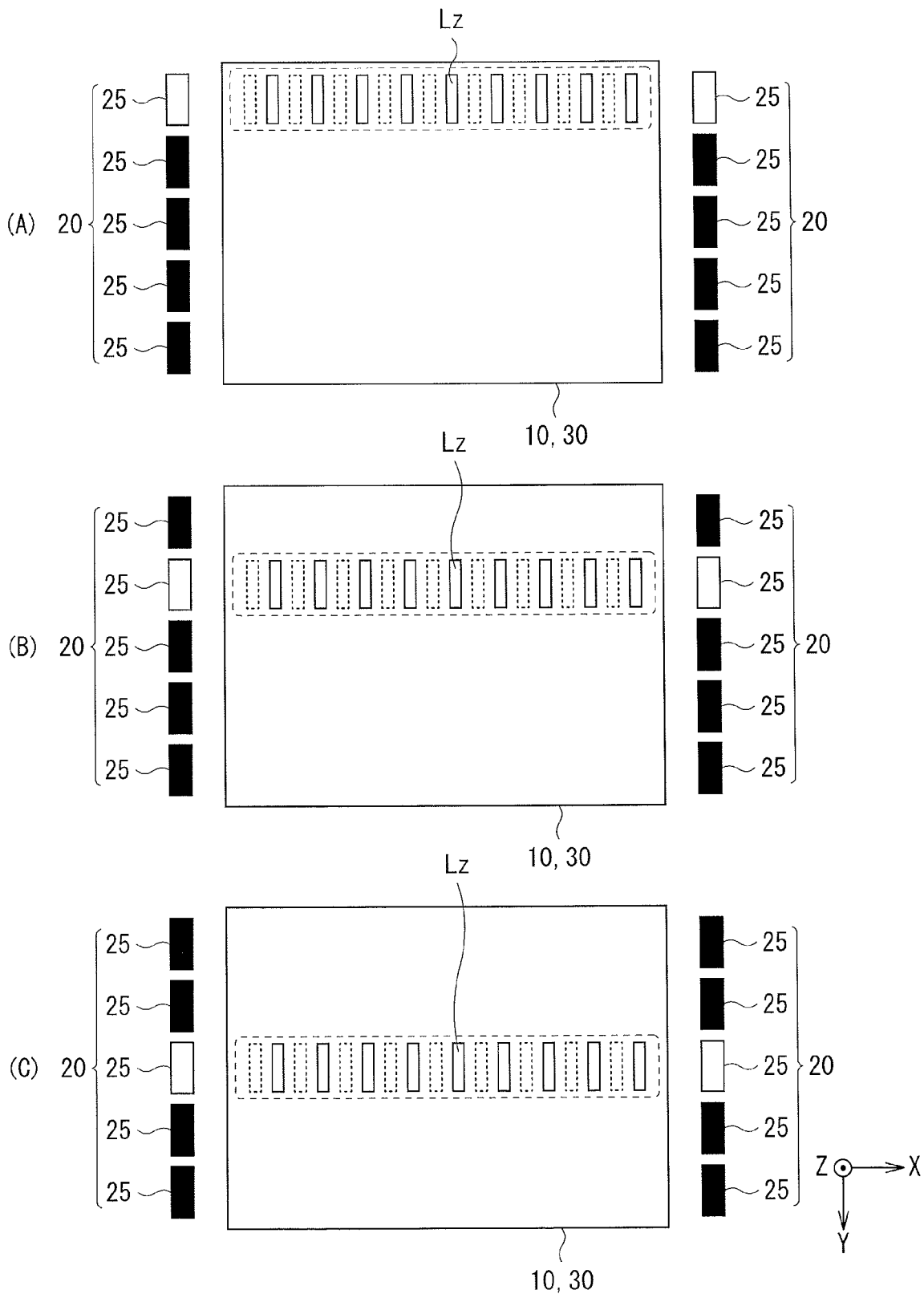
FIGS. 31A through 31C show a plan view illustrating an example of the scanning following FIG. 30.

(A) to (C) of FIG. 30 and (A) to (C) of FIG. 31 schematically illustrate another example of the scanning of the linear illumination light beams Lz (the illumination light beams) of the backlight 211 in three-dimensional display. When the light source 20 is configured of the plurality of light source blocks 25, for example, the drive circuit 50 may turn on only the light source block 25 corresponding to the pixel row that is selected by the selection signal, and apply the drive voltage (the voltage generating an electric field in the light modulation layer 34) to the partial electrode 36A corresponding to the pixel row that is selected by the selection signal. At this time, during first 1F, the drive circuit 50 applies a common fixed voltage (for example, the ground voltage) to the partial electrodes 36A corresponding to pixel rows that are not selected by the selection signal, and the partial electrodes 32B, as well as puts the partial electrodes 32C into a floating state. Further, during next 1F, the drive circuit 50 applies a common fixed voltage (for example, the ground potential) to the partial electrodes 36A corresponding to the pixel rows that are not selected by the selection signal, and the partial electrodes 32C, as well as puts the partial electrodes 32B into a floating state. In such a case, the consumed power is allowed to be suppressed low by an amount of non-lighting parts of the light source 20.

Figure 32:
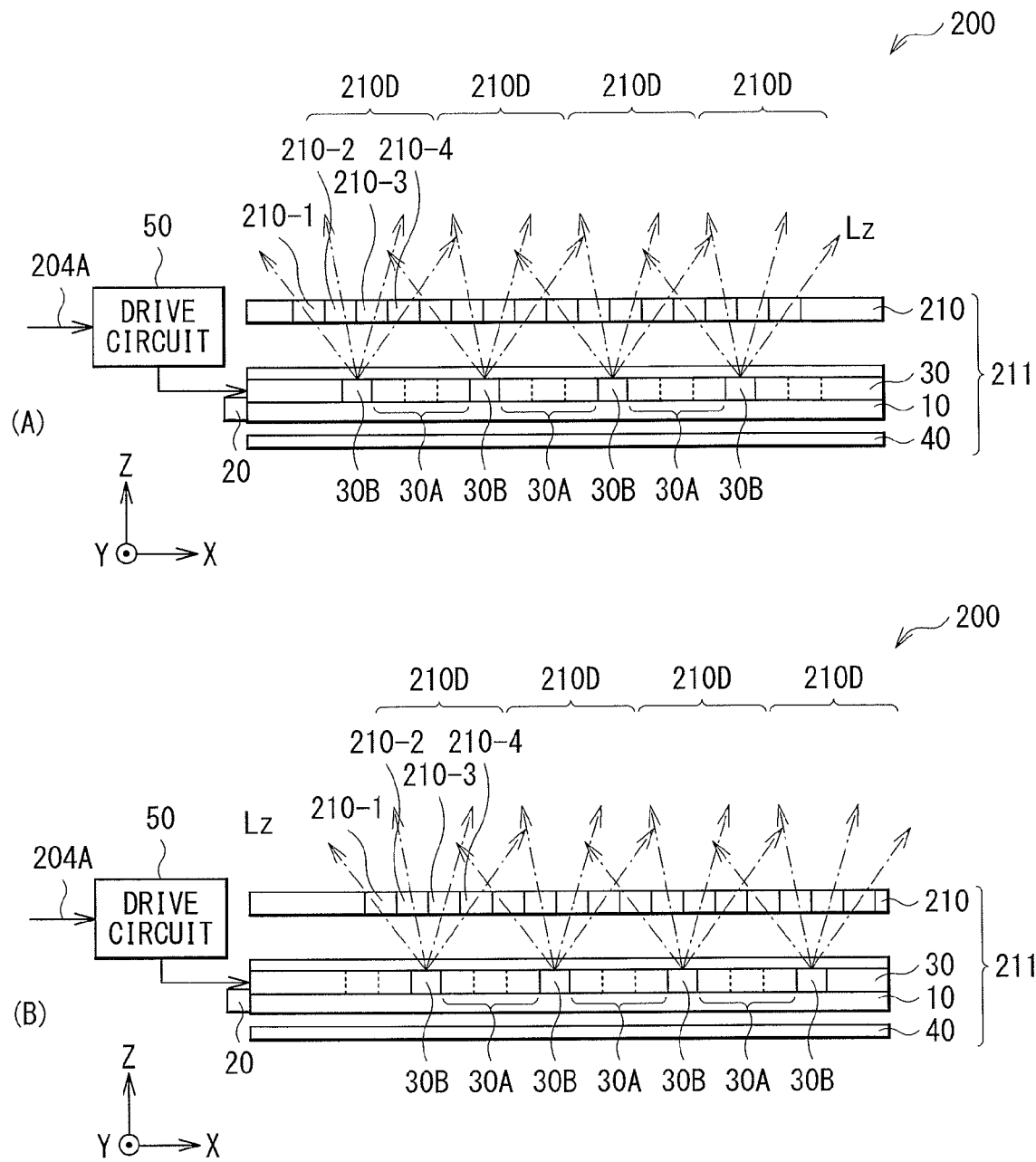
FIGS. 32A and 32B show a schematic diagram of an example of a three-dimensional display state as viewed from the cross-sectional surface of the receiver.

(A) of FIG. 32 illustrates an example of a cross-sectional structure of a part where the plurality of linear illumination light beams Lz (the illumination light beams) is emitted in (A) to (C) of FIG. 27 and (A) to (C) of FIG. 30. (B) of FIG. 32 illustrates an example of a cross-sectional structure of a part where the plurality of linear illumination light beams Lz (the illumination light beams) is emitted in (A) to (C) of FIG. 28 and (A) to (C) of FIG. 31.

In three-dimensional display, for example, the panel drive circuit 209 may drive the four pixels 210-1 to 210-4 of the display panel 210 as one three-dimensional pixel 210D. At this time, for example, the drive circuit 50 may form one scattering region 30B for each three-dimensional pixel 210D, and may allow the linear illumination light beams Lz to enter the respective pixels 210-1 to 210-4 at different incident angles. Accordingly, each of the linear illumination light beams Lz enters, at the substantially same angle, the pixel located in a position common to the respective three-dimensional pixels 210D (for example, in (A) and (B) of FIG. 32, 210-1, 210-2, 210-3, or 210-4). As a result, from the pixel located in a position common to the respective three-dimensional pixels 210D, picture light modulated by the pixel is emitted at the predetermined angle. At this time, for example, during first 1F, a viewer may view picture light from the pixel 210-3 with his right eye, and at the same time, the viewer may view picture light from the pixel 210-2 with his left eye. Further, for example, during next 1F, the viewer may view picture light from the pixel 210-3 that has been located at the position of the pixel 210-4 in the first 1F with his right eye, and at the same time, the viewer may view picture light from the pixel 210-2 that has been located at the position of the pixel 210-3 in the first 1F with his left eye. In other words, the viewer views the pictures with different parallaxes with resolution two times larger than the resolution in the above-described embodiment, with his right and left eyes. As a result, the viewer perceives display of a three-dimensional picture (a stereoscopic picture) with extremely high resolution on the display panel 210.

Incidentally, in the present modification, when a three-dimensional picture is displayed on the display panel 210, the scanning of the linear illumination light beams Lz (the partial illumination light beams) is performed in synchronization with the scanning of the display panel 210. Therefore, it is possible to put a region under picture rewriting into a non-display state surely. As a result, it is possible to prevent occurrence of crosstalk.

(Fourth Modification)

Figure 33:
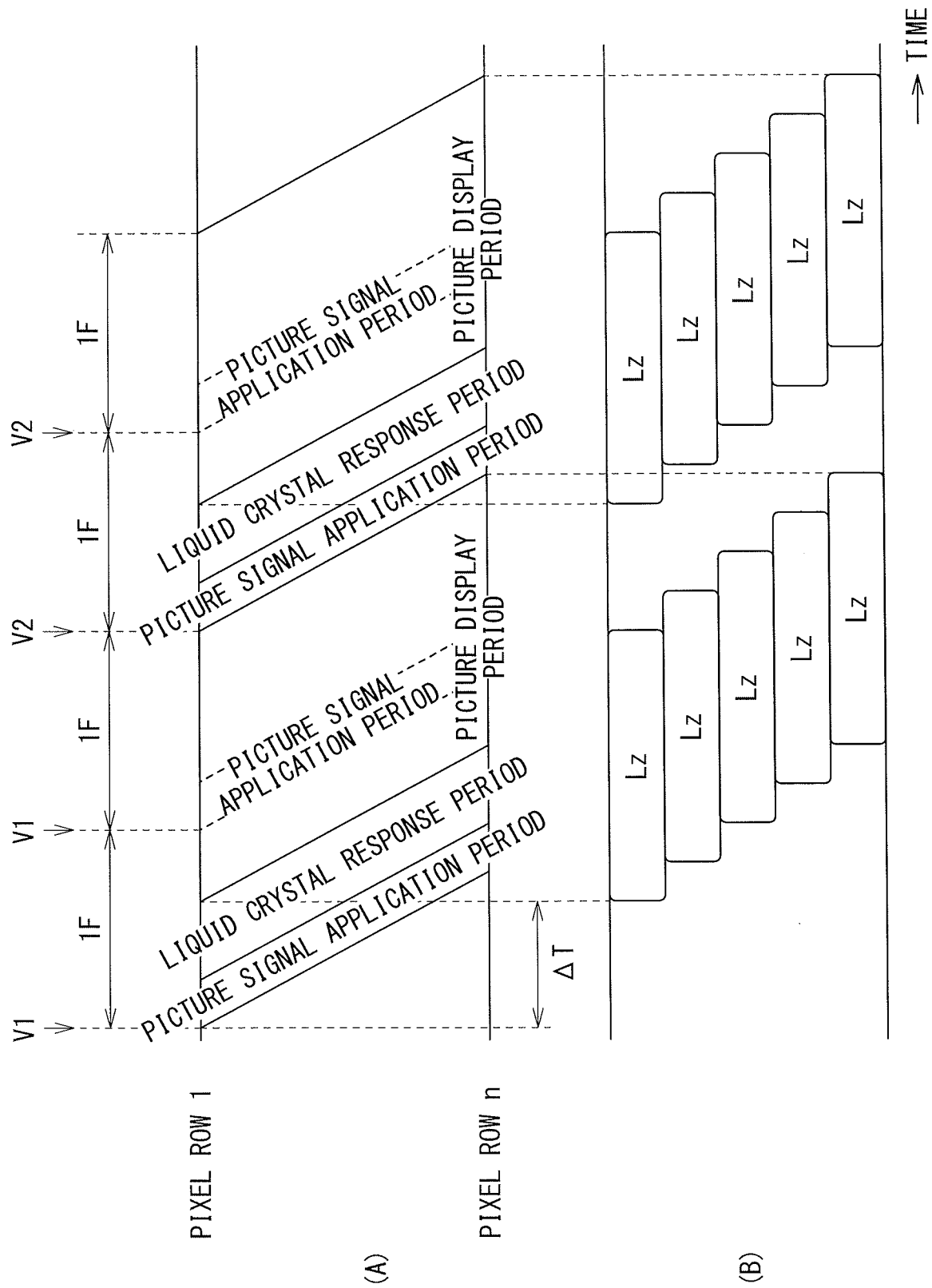
FIGS. 33A and 33B show a diagram illustrating another example of the scanning in FIG. 14.

In the above-described embodiment and the modifications thereof, when one piece of two-dimensional picture data is created with use of the plurality of pieces of two-dimensional picture data with different perspectives that are contained in the picture data for three-dimensional display input from the decoder 206, the picture signal processing circuit 207 may output the two-dimensional picture data twice during 1F period. In this case, for example, as illustrated in (A) of FIG. 33, the panel drive circuit 209 outputs the same picture signal to the respective data lines in the first half and the last half in the 1F period. At this time, for example, the drive circuit 50 may turn on only the light source block 25 corresponding to the pixel row that is selected by the selection signal, and apply the drive voltage (the voltage generating an electric field in the light modulation layer 34) to the partial electrode 36A corresponding to the pixel row that is selected by the selection signal.

Figure 34:
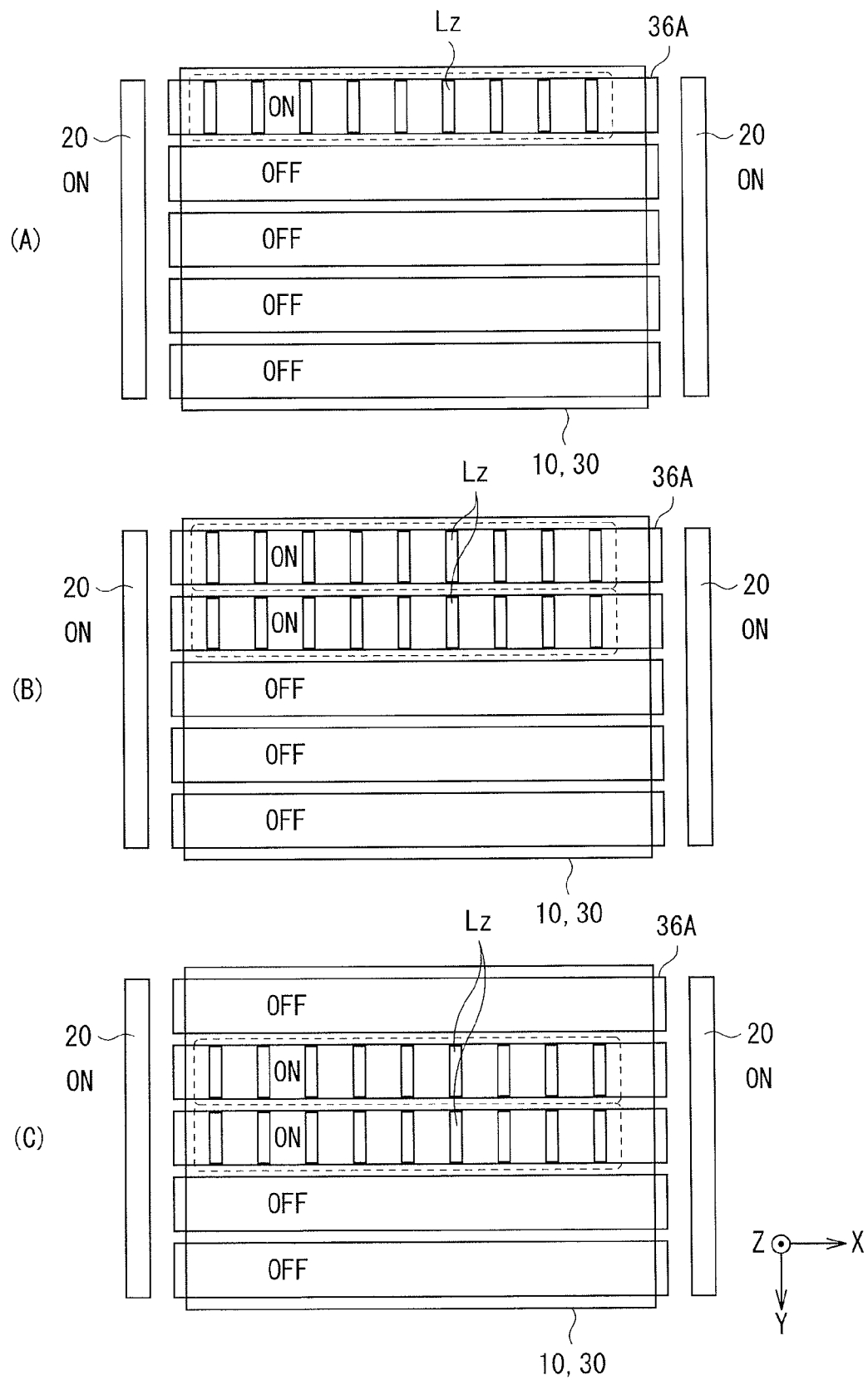
FIGS. 34A through 34C is a plan view illustrating an example of the scanning of the illumination light beams of the backlight in FIG. 33.
Figure 35:
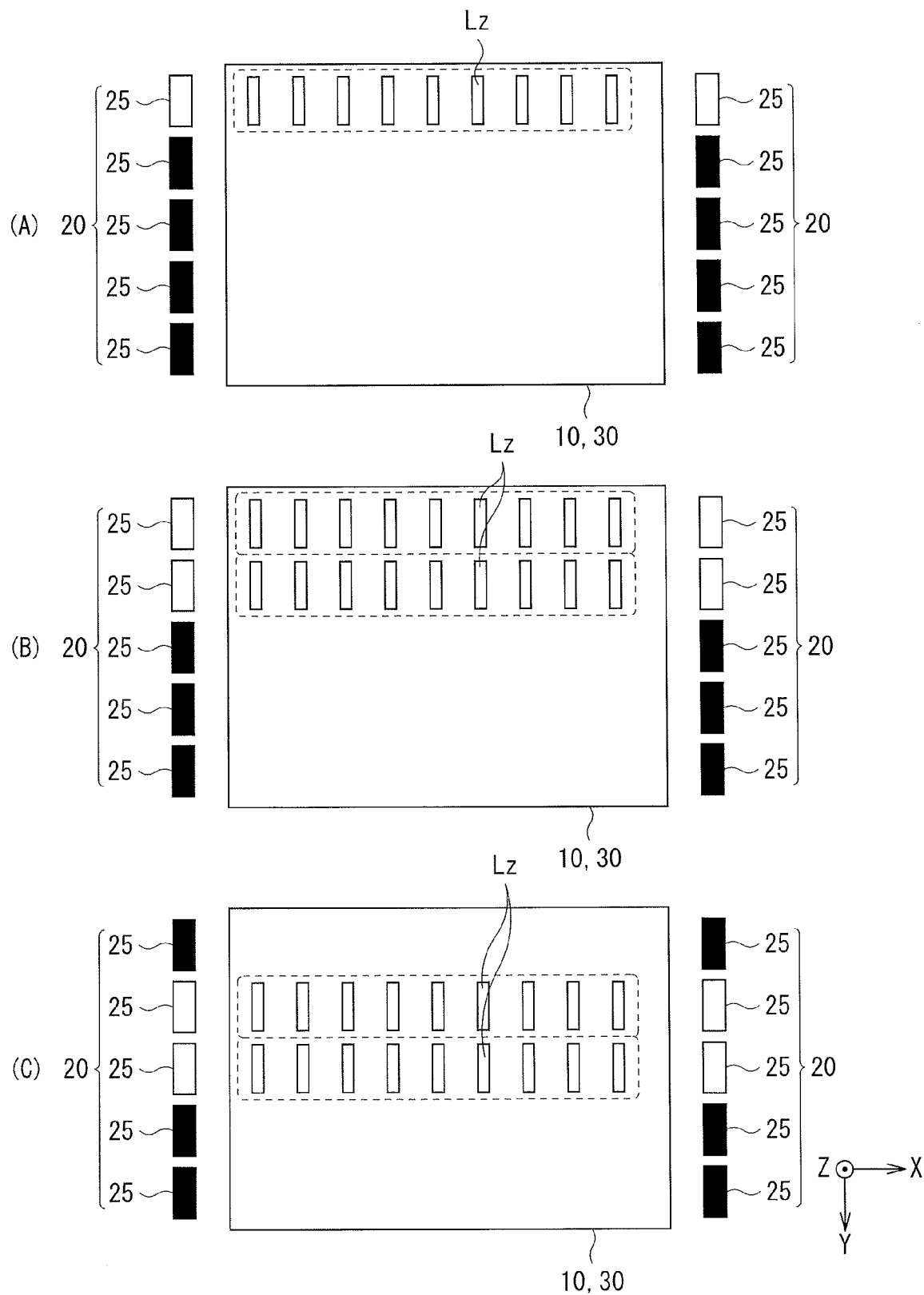
FIGS. 35A through 35C is a plan view illustrating another example of the scanning of the illumination light beams of the backlight in FIG. 33.

(A) to (C) of FIG. 34 schematically illustrate an example of the scanning of the linear illumination light beams Lz (the illumination light beams) of the backlight 211 in three-dimensional display. (A) to (C) of FIG. 35 schematically illustrate another example of the scanning of the linear illumination light beams Lz (the illumination light beams) of the backlight 211 in three-dimensional display. As illustrated in (A) to (C) of FIG. 34, the drive circuit 50 applies the drive voltage (the voltage generating an electric field in the light modulation layer 34) to the partial electrode 36A corresponding to the pixel row that is selected by the selection signal. At this time, the drive circuit 50 applies the drive voltage during a time period from the first half of the 1F period to a time not exceeding a start time of the next 1F period. Further, at this time, the drive circuit 50 applies a common fixed voltage (for example, the ground potential) to the partial electrodes 36A corresponding to the pixel rows that are not selected by the selection signal, and the partial electrodes 32B, as well as puts the partial electrodes 32C into a floating state.

Moreover, when the light source 20 is configured of the plurality of light source blocks 25, for example, as illustrated in (A) to (C) of FIG. 35, the drive circuit 50 may turn on only the light source block 25 corresponding to the pixel row that is selected by the selection signal, and apply the drive voltage (the voltage generating an electric field in the light modulation layer 34) to the partial electrode 36A corresponding to the pixel row that is selected by the selection signal. At this time, the drive circuit 50 applies the drive voltage during a time period from the first half of the 1F period until a time not exceeding the start time of the next 1F period. In addition, the drive circuit 50 turns on the light source block 25 corresponding to the pixel row that is selected by the selection signal, during a time period after a predetermined period is elapsed from the time selected by the selection signal until a time that is selected by a second selection signal (a selection signal applied at the start time of the next 1F period). Further, at this time, the drive circuit 50 applies a common fixed voltage (for example, the ground potential) to the partial electrodes 36A corresponding to the pixel rows that are not selected by the selection signal, and the partial electrodes 32B, and puts the partial electrodes 32C into a floating state. In this case, the consumed power is allowed to be suppressed low by an amount of non-lighting parts of the light source 20.

Moreover, for example, the present technology may be configured as follows.

(1) A display unit including:
a display panel having a plurality of pixels;
a backlight capable of partially illuminating the display panel; and
a drive circuit configured to drive the display panel and the backlight, wherein the drive circuit synchronizes scanning of the display panel with scanning of partial illumination light beams of the backlight to allow the display panel to display a three-dimensional picture.

(2) The display unit according to (1), wherein
the backlight includes
a first transparent substrate and a second transparent substrate that are disposed to face each other with a distance in between,
a light source configured to apply light to an end surface of the first transparent substrate or an end surface of the second transparent substrate,
a light modulation layer provided in a clearance between the first transparent substrate and the second transparent substrate, and exhibiting scattering property or transparency to the light from the light source depending on magnitude of an electric field, and
an electrode configured to generate the electric field in the light modulation layer when a voltage is applied,
the drive circuit outputs a picture signal for one pixel row including a plurality of two-dimensional picture signals with different perspectives, to the display panel, and outputs a selection signal to sequentially select pixel row, to the display panel, and
the drive circuit drives the light modulation layer in synchronization with the output of the selection signal to the display panel, to generate a plurality of scattering regions that exhibit scattering property to the light from the light source in a region corresponding to a pixel row that is selected by the selection signal in the light modulation layer, and allows the display panel to display the three-dimensional picture with use of illumination light beams emitted from the respective scattering regions.

(3) The display unit according to (2), wherein the drive circuit generates the plurality of scattering regions in a region corresponding to the pixel row selected by the selection signal after a predetermined period is elapsed from a time selected by the selection signal.

(4) The display unit according to (3), wherein the drive circuit generates the plurality of scattering regions in a region corresponding to the pixel row selected by the selection signal during a time period after a predetermined period is elapsed from a time selected by the selection signal until a time selected by a next selection signal.

(5) The display unit according to (3), wherein the drive circuit generates the plurality of scattering regions in a region corresponding to the pixel row selected by the selection signal during a time period after a predetermined period is elapsed from a time selected by the selection signal until a time selected by a next selection signal.

(6) The display unit according to any one of (3) to (5), wherein
the light source is configured of a plurality of light source blocks arranged in line, and
the drive circuit turns on the light source blocks corresponding to the pixel row selected by the selection signal after a predetermined period is elapsed from a time selected by the selection signal.

(7) The display unit according to (4), wherein
the light source is configured of a plurality of light source blocks arranged in line, and
the drive circuit turns on the light source blocks corresponding to the pixel row selected by the selection signal during a time period after a predetermined period is elapsed from a time selected by the selection signal until a time selected by a next selection signal.

(8) The display unit according to (5), wherein
the light source is configured of a plurality of light source blocks arranged in line, and
the drive circuit turns on the light source blocks corresponding to the pixel row selected by the selection signal during a time period after a predetermined period is elapsed from a time selected by the selection signal until a time selected by a second selection signal.

(9) The display unit according to any one of (2) to (8), wherein
the electrode includes a first electrode and a second electrode, the first electrode being provided on a side closer to the first transparent substrate than the light modulation layer, and the second electrode being provided on a side closer to the second transparent substrate than the light modulation layer,
the first electrode is configured of a plurality of partial electrodes each extending in a direction parallel to a scanning direction of partial illumination light beams of the backlight,
the second electrode is configured of a plurality of partial electrodes each extending in a direction intersecting the scanning direction of the partial illumination light beams of the backlight, and
the drive circuit drives a first partial electrode to generate the plurality of scattering regions, the first partial electrode corresponding to a part of the plurality of partial electrodes configuring the second electrode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

(10) The display unit according to (9), wherein the drive circuit applies a common fixed voltage to a second partial electrode and the first electrode, and applies a voltage that generates an electric field in the light modulation layer, to the first partial electrode to generate the plurality of scattering regions, the second partial electrode being the partial electrodes other than the first partial electrode out of the plurality of partial electrodes configuring the second electrode.

(11) The display unit according to (9), wherein
the light source is configured of a plurality of light source blocks arranged in line, and
the drive circuit turns on a first light source block to emit illumination light beams from the respective scattering regions, the first light source block corresponding to the first partial electrode out of the plurality of light source blocks.

(12) The display unit according to (10), wherein
the light source is configured of a plurality of light source blocks arranged in line, and
the drive circuit turns on a first light source block and turns off a second light source block to emit illumination light beams from the respective scattering regions, the first light source block corresponding to the first partial electrode out of the plurality of light source blocks, and the second light source block being light source blocks other than the first light source block out of the plurality of light source blocks.

The invention claimed is:
1. A display unit comprising:
a display panel having a plurality of pixels;
a backlight capable of partially illuminating the display panel; and
a drive circuit configured to drive the display panel and the backlight, wherein the drive circuit synchronizes scanning of the display panel with scanning of partial illumination light beams of the backlight to allow the display panel to display a three-dimensional picture, wherein the backlight includes
- a first transparent substrate and a second transparent substrate that are disposed to face each other with a distance in between,
- a light source configured to apply light to an end surface of the first transparent substrate,
- a light modulation layer provided in a clearance between the first transparent substrate and the second transparent substrate, and exhibiting scattering property or transparency to the light from the light source depending on magnitude of an electric field, and
- an electrode configured to generate the electric field in the light modulation layer when a voltage is applied, wherein the drive circuit outputs a picture signal for one pixel row including a plurality of two-dimensional picture signals with different perspectives, to the display panel, and outputs a selection signal to sequentially select pixel row, to the display panel, and wherein the drive circuit drives the light modulation layer in synchronization with the output of the selection signal to the display panel, to generate a plurality of scattering regions that exhibit scattering property to the light from the light source in a region corresponding to a pixel row that is selected by the selection signal in the light modulation layer, and allows the display panel to display the three-dimensional picture with use of illumination light beams emitted from the respective scattering regions.

2. The display unit according to claim 1, wherein the drive circuit generates the plurality of scattering regions in a region corresponding to the pixel row selected by the selection signal after a predetermined period is elapsed from a time selected by the selection signal.

3. The display unit according to claim 2, wherein the drive circuit generates the plurality of scattering regions in a region corresponding to the pixel row selected by the selection signal during a time period after a predetermined period is elapsed from a time selected by the selection signal until a time selected by a next selection signal.

4. The display unit according to claim 3, wherein
the light source is configured of a plurality of light source blocks arranged in line, and
the drive circuit turns on the light source blocks corresponding to the pixel row selected by the selection signal during a time period after a predetermined period is elapsed from a time selected by the selection signal until a time selected by a next selection signal.

5. The display unit according to claim 2, wherein the drive circuit generates the plurality of scattering regions in a region corresponding to the pixel row selected by the selection signal during a time period after a predetermined period is elapsed from a time selected by the selection signal until a time selected by a next selection signal.

6. The display unit according to claim 5, wherein
the light source is configured of a plurality of light source blocks arranged in line, and
the drive circuit turns on the light source blocks corresponding to the pixel row selected by the selection signal during a time period after a predetermined period is elapsed from a time selected by the selection signal until a time selected by a second selection signal.

7. The display unit according to claim 2, wherein
the light source is configured of a plurality of light source blocks arranged in line, and
the drive circuit turns on the light source blocks corresponding to the pixel row selected by the selection signal after a predetermined period is elapsed from a time selected by the selection signal.

8. The display unit according to claim 1, wherein
the electrode includes a first electrode and a second electrode, the first electrode being provided on a side closer to the first transparent substrate than the light modulation layer, and the second electrode being provided on a side closer to the second transparent substrate than the light modulation layer,
the first electrode is configured of a plurality of partial electrodes each extending in a direction parallel to a scanning direction of partial illumination light beams of the backlight,
the second electrode is configured of a plurality of partial electrodes each extending in a direction intersecting the scanning direction of the partial illumination light beams of the backlight, and
the drive circuit drives a first partial electrode to generate the plurality of scattering regions, the first partial electrode corresponding to a part of the plurality of partial electrodes configuring the second electrode.

9. The display unit according to claim 8, wherein the drive circuit applies a common fixed voltage to a second partial electrode and the first electrode, and applies a voltage that generates an electric field in the light modulation layer, to the first partial electrode to generate the plurality of scattering regions, the second partial electrode being the partial electrodes other than the first partial electrode out of the plurality of partial electrodes configuring the second electrode.

10. The display unit according to claim 9, wherein
the light source is configured of a plurality of light source blocks arranged in line, and
the drive circuit turns on a first light source block and turns off a second light source block to emit illumination light beams from the respective scattering regions, the first light source block corresponding to the first partial electrode out of the plurality of light source blocks, and the second light source block being light source blocks other than the first light source block out of the plurality of light source blocks.

11. The display unit according to claim 8, wherein
the light source is configured of a plurality of light source blocks arranged in line, and
the drive circuit turns on a first light source block to emit illumination light beams from the respective scattering regions, the first light source block corresponding to the first partial electrode out of the plurality of light source blocks.

* * * * *